United States Patent
Takahira et al.

(10) Patent No.: US 9,366,399 B2
(45) Date of Patent: Jun. 14, 2016

(54) LIGHT EMITTING DEVICE, ILLUMINATION DEVICE, AND VEHICLE HEADLAMP

(71) Applicant: Sharp Kabushiki Kaisha, Osaka-shi (JP)

(72) Inventors: Yoshiyuki Takahira, Osaka (JP); Yosuke Maemura, Osaka (JP); Yasuo Fukai, Osaka (JP); Koji Takahashi, Osaka (JP)

(73) Assignee: SHARP KABUSHIKI KAISHA, Osaka-Shi (JP)

( * ) Notice: Subject to any disclaimer, the term of this patent is extended or adjusted under 35 U.S.C. 154(b) by 0 days.

(21) Appl. No.: 14/596,808

(22) Filed: Jan. 14, 2015

(65) Prior Publication Data

US 2015/0124432 A1    May 7, 2015

Related U.S. Application Data

(63) Continuation of application No. 13/407,366, filed on Feb. 28, 2012, now Pat. No. 8,974,089.

(30) Foreign Application Priority Data

Mar. 3, 2011    (JP) .................. 2011-046894

(51) Int. Cl.
*F21V 9/16*    (2006.01)
*F21K 99/00*    (2016.01)
(Continued)

(52) U.S. Cl.
CPC ............... *F21K 9/56* (2013.01); *F21S 48/1145* (2013.01); *F21S 48/1159* (2013.01); *F21V 9/16* (2013.01); *B60Q 1/28* (2013.01); *F21V 29/2206* (2013.01); *F21V 29/74* (2015.01); *F21Y 2101/025* (2013.01)

(58) Field of Classification Search
CPC ............... F21V 9/16; F21V 9/08; F21V 9/00; F21K 9/56; F21Y 2101/025
See application file for complete search history.

(56) References Cited

U.S. PATENT DOCUMENTS 5,535,230 A    7/1996    Abe
5,962,971 A    10/1999    Chen
(Continued)

FOREIGN PATENT DOCUMENTS

CN    1661825    8/2005
CN    1676986    10/2005
(Continued)

OTHER PUBLICATIONS

Fukai et al., U.S. Office Action mailed Apr. 15, 2015, directed to U.S. Appl. No. 13/297,008; 18 pages.
(Continued)

*Primary Examiner* — Y M Lee
(74) *Attorney, Agent, or Firm* — Morrison & Foerster LLP

(57) ABSTRACT

An illumination device 1 which is a light emitting device capable of emitting white light, includes: a laser element 2 for emitting a blue laser beam; a light emitting section 4 for generating fluorescence by be being irradiated with the blue laser beam emitted from the laser element 2; and a parabolic mirror 5 for reflecting the fluorescence generated from the light emitting section 4, the parabolic mirror 5 being disposed on an irradiated surface side which irradiated surface is a surface of the light emitting section 4 which surface is irradiated with the blue laser beam. This allows the illumination device 1 to efficiently project the white illumination light.

2 Claims, 19 Drawing Sheets

(51) Int. Cl.
*F21S 8/10* (2006.01)
*B60Q 1/28* (2006.01)
*F21Y 101/02* (2006.01)
*F21V 29/74* (2015.01)
*F21V 29/00* (2015.01)

(56) References Cited

U.S. PATENT DOCUMENTS

| | | |
|---|---|---|
| 6,412,971 B1 | 7/2002 | Wojnarowski et al. |
| 7,084,435 B2 | 8/2006 | Sugimoto et al. |
| 7,131,759 B2 | 11/2006 | Ishida et al. |
| 7,144,131 B2 | 12/2006 | Rains |
| 7,165,871 B2 | 1/2007 | Takeda et al. |
| 7,168,837 B2 | 1/2007 | Ishida et al. |
| 7,232,247 B2 | 6/2007 | Yatsuda et al. |
| 7,282,748 B2 | 10/2007 | Takeda et al. |
| 7,382,091 B2 | 6/2008 | Chen et al. |
| 7,388,232 B2 | 6/2008 | Suehiro et al. |
| 7,810,954 B2 | 10/2010 | Kolodin |
| 8,342,720 B2 | 1/2013 | Harada et al. |
| 8,348,458 B2 | 1/2013 | Holten et al. |
| 2001/0028565 A1 | 10/2001 | Ishida |
| 2002/0015308 A1 | 2/2002 | Naganawa et al. |
| 2004/0120155 A1 | 6/2004 | Suenaga |
| 2004/0145895 A1 | 7/2004 | Ouderkirk et al. |
| 2004/0184279 A1 | 9/2004 | Molto et al. |
| 2004/0223337 A1 | 11/2004 | Ishida |
| 2005/0105301 A1 | 5/2005 | Takeda et al. |
| 2005/0157508 A1 | 7/2005 | Takeda et al. |
| 2005/0231971 A1 | 10/2005 | Ishida |
| 2005/0236628 A1 | 10/2005 | Matsuura |
| 2005/0270775 A1 | 12/2005 | Harbers et al. |
| 2006/0139926 A1 | 6/2006 | Morioka et al. |
| 2007/0080362 A1 | 4/2007 | Scotch et al. |
| 2007/0201241 A1 | 8/2007 | Komatsu |
| 2008/0007961 A1 | 1/2008 | Mochizuki et al. |
| 2008/0198572 A1* | 8/2008 | Medendorp ........... F21V 7/0008 362/84 |
| 2008/0239746 A1 | 10/2008 | Wuller et al. |
| 2009/0003400 A1 | 1/2009 | Nagahama et al. |
| 2009/0046474 A1 | 2/2009 | Sato et al. |
| 2009/0231866 A1 | 9/2009 | Yamamura |
| 2009/0231874 A1 | 9/2009 | Kishimoto et al. |
| 2009/0273918 A1 | 11/2009 | Falicoff et al. |
| 2010/0008099 A1 | 1/2010 | Inoue et al. |
| 2010/0102199 A1 | 4/2010 | Negley et al. |
| 2010/0128463 A1 | 5/2010 | Kim et al. |
| 2010/0232173 A1 | 9/2010 | Ohno et al. |
| 2011/0085343 A1 | 4/2011 | Ohno et al. |
| 2011/0085352 A1 | 4/2011 | Ito et al. |
| 2011/0198566 A1 | 8/2011 | Yoshizumi et al. |
| 2011/0215701 A1 | 9/2011 | Tong et al. |
| 2011/0248624 A1 | 10/2011 | Kishimoto et al. |
| 2011/0280031 A1 | 11/2011 | Luger et al. |
| 2012/0026721 A1 | 2/2012 | Kurt et al. |
| 2012/0068630 A1 | 3/2012 | Li et al. |
| 2012/0074833 A1* | 3/2012 | Yuan et al. ............. H05B 33/14 313/483 |
| 2012/0104934 A1 | 5/2012 | Fukai et al. |
| 2012/0106183 A1 | 5/2012 | Takahashi |
| 2012/0106188 A1 | 5/2012 | Takahashi et al. |
| 2012/0106189 A1 | 5/2012 | Takahashi et al. |
| 2012/0140504 A1 | 6/2012 | Fukai et al. |
| 2012/0163009 A1 | 6/2012 | Nakazato et al. |
| 2013/0003403 A1 | 1/2013 | Takahira et al. |
| 2013/0119862 A1 | 5/2013 | Ahn et al. |
| 2014/0112012 A1 | 4/2014 | Nakazato et al. |

FOREIGN PATENT DOCUMENTS

| | | |
|---|---|---|
| CN | 101629689 | 1/2010 |
| DE | 10 2005 041 234 | 3/2007 |
| DE | 10 2007 008 994 | 9/2007 |
| DE | 10 2009 053 581 | 3/2011 |
| EP | 2 280 215 | 2/2011 |
| JP | 7-282609 | 10/1995 |
| JP | 7-318998 | 12/1995 |
| JP | 2002-87153 | 3/2002 |
| JP | 2003-295319 | 10/2003 |
| JP | 2004-231179 | 8/2004 |
| JP | 2004-241142 | 8/2004 |
| JP | 2004-327361 | 11/2004 |
| JP | 2005-150041 | 6/2005 |
| JP | 2005-205195 | 8/2005 |
| JP | 2006-210887 | 8/2006 |
| JP | 2006-253019 | 9/2006 |
| JP | 2007-16171 | 1/2007 |
| JP | 2007-30570 | 2/2007 |
| JP | 2007-142173 | 6/2007 |
| JP | 2007-200782 | 8/2007 |
| JP | 2008-13014 | 1/2008 |
| JP | 2008-227042 | 9/2008 |
| JP | 2009-9898 | 1/2009 |
| JP | 2009-48786 | 3/2009 |
| JP | 2009-513003 | 3/2009 |
| JP | 2009-67083 | 4/2009 |
| JP | 2009-96250 | 5/2009 |
| JP | 2009-129683 | 6/2009 |
| JP | 2009-266437 | 11/2009 |
| JP | 2009-302196 | 12/2009 |
| JP | 2010-86815 | 4/2010 |
| JP | 2010-140663 | 6/2010 |
| JP | 2010-153241 | 7/2010 |
| JP | 2010-184625 | 8/2010 |
| JP | 2010-198805 | 9/2010 |
| JP | 2010-212148 | 9/2010 |
| JP | 2010-212615 | 9/2010 |
| JP | 2010-232044 | 10/2010 |
| JP | 2010-277123 | 12/2010 |
| JP | 2011-21062 | 2/2011 |
| JP | 2012-243727 | 12/2012 |
| TW | 200604466 | 2/2006 |
| WO | WO-2007/105647 | 9/2007 |
| WO | WO-2009/145298 | 12/2009 |
| WO | WO-2010/116305 | 10/2010 |

OTHER PUBLICATIONS

Partial European Search Report dated May 15, 2015, directed to EP Application No. 12004832.7; 5 pages.

Fukai et al., Examiner's Answer mailed Oct. 1, 2015, directed to U.S. Appl. No. 13/297,008; 7 pages.

Takahira et al., U.S. Office Action mailed Oct. 1, 2015, directed to U.S. Appl. No. 14/793,556; 6 pages.

Fukai, et al., U.S. Office Action mailed Jan. 14, 2015, directed to U.S. Appl. No. 13/297,008; 20 pages.

Takahashi, K. et al. "'Laser Headlight' for Next Generation Automotive Lighting." Proceedings for the 9th International Symposium on Automotive Lighting. Darmstadt, Germany. Sep. 26-28, 2011. pp. 271-283 with cover page.

Takahashi et al., U.S. Office Action mailed Jun. 11, 2013, directed to U.S. Appl. No. 13/284,487; 13 pages.

Takahashi et al., U.S. Notice of Allowance mailed Nov. 20, 2013, directed to U.S. Appl. No. 13/284,487; 13 pages.

Takahashi et al., U.S. Office Action mailed Aug. 8, 2013, directed to U.S. Appl. No. 13/284,523; 17 pages.

Takahashi et al., U.S. Notice of Allowance mailed Jan. 27, 2014, directed to U.S. Appl. No. 13/284,523; 8 pages.

Fukai et al., U.S Office Action mailed Feb. 10, 2014, directed to U.S. Appl. No. 13/297,008; 12 pages.

Fukai et al., U.S Office Action mailed May 23, 2014, directed to U.S. Appl. No. 13/297,008; 15 pages.

Fukai et al., U.S Office Action mailed Aug. 7, 2014, directed to U.S. Appl. No. 13/297,008; 16 pages.

Fukai et al., U.S. Advisory Action mailed Nov. 4, 2014, directed to U.S. Appl. No. 13/297,008; 9 pages.

(56) References Cited

OTHER PUBLICATIONS

Takahira et al., U.S. Office Action mailed Jun. 13, 2014, directed to U.S. Appl. No. 13/407,366; 15 pages.

Takahira et al., U.S. Notice of Allowance mailed Nov. 4, 2014, directed to U.S. Appl. No. 13/407,366; 7 pages.

Takahira et al., U.S. Office Action mailed Jul. 1, 2014, directed to U.S. Appl. No. 13/533,550; 7 pages.

Takahira et al., U.S. Office Action mailed Dec. 29, 2014, directed to U.S. Appl. No. 13/533,550; 9 pages.

Takahashi, U.S. Notice of Allowance mailed Feb. 21, 2014, directed to U.S. Appl. No. 13/280,572; 10 pages.

* cited by examiner

FLUORESCENT MATERIAL

LIGHT EMITTING DEVICE, ILLUMINATION DEVICE, AND VEHICLE HEADLAMP

This application is a continuation of U.S. application Ser. No. 13/407,366, filed Feb. 28, 2012, which claims priority under 35 U.S.C. §119(a) on Patent Application No. 2011-046894 filed in Japan on Mar. 3, 2011, the entire contents of which are hereby incorporated by reference.

TECHNICAL FIELD

The present invention relates to a light emitting device, an illumination device, and a vehicle headlamp each of which makes it possible to obtain a white color by exciting a fluorescent material by using a solid light emitting element such as a laser as an excitation light source.

BACKGROUND ART

Recently, research is conducted on light emitting devices in which a light emitting section containing a fluorescent material generates illumination light by being irradiated with excitation light generated from an excitation light source which is a semiconductor light emitting element such as an LED (Light Emitting Diode) and an LD (Laser Diode).

Patent Literature 1 discloses an example of a technique related to such light emitting devices.

A light emitting device disclosed in Patent Literature 1 is such that excitation light emitted from a light emitting element enters an optical fiber via a lens so that a fluorescent substance provided to a tip of the optical fiber is irradiated with the excitation light, and the fluorescent substance accordingly emits illumination light to the outside of the light emitting device. According to Patent Literature 1, the excitation light is preferably a laser beam having its emission peak in a range from 350 nm to 500 nm.

CITATION LIST

Patent Literatures

Patent Literature 1
Japanese Patent Application Publication, Tokukai, No. 2005-205195 A (Publication Date: Aug. 4, 2005)
Patent Literature 2
Japanese Patent Application Publication, Tokukaihei, No. 7-282609 A (Publication Date: Oct. 27, 1995)

SUMMARY OF INVENTION

Technical Problem

However, the technique of Patent Literature 1 is such an arrangement that the fluorescence is obtained from that surface of the fluorescent substance which is opposite to its surface on which the excitation light is incident (hereinafter, this type of light emitting device is also referred to as "transmissive" light emitting device). The arrangement bears both a merit and a demerit. That is, there are issues particularly in that: it is difficult to obtain a high-luminance point light source with a small light emitting area; and it is difficult to realize an ultrahigh-luminance light source which is required particularly in a case of applying this arrangement in such a way that the high-luminance point light source serves as a point light source and the emitted white light is projected by an ultracompact reflector or the like.

That is, even if the light emitting section is irradiated with focused excitation light in the transmissive light emitting device, the focused excitation light is scattered by the fluorescent material while traveling from that irradiated surface (one end) of the light emitting section to which the excitation light enters to that light emitting surface (another end) of the light emitting section from which visible light is emitted. As a result, the transmissive light emitting device has a problem of increase of an area on the light emitting surface from which area the scattered excitation light and the fluorescence are emitted. In a case where, e.g., a focused laser is employed as the excitation light source for exciting the fluorescent material, a major merit is that a point light source with an ultrahigh luminance can be obtained by exciting a small area.

The term "point light source" indicates that the light source is so small that the light source is optically regarded as a substantial point light source. Even a large light source can be utilized as a substantial point light source in some cases if an optical system in which the light source is used is relatively large. However, in a case where an optical system is very small, the light source should have a sufficiently small size in order to function as a point light source substantially. In the present invention, a light source having a sufficiently small size relative to a size of an optical system is referred to as "point light source."

However, there is a problem to be solved in a case where an ultrahigh point light source is realized in a transmissive light emitting device. The following explains this, with reference to FIG. 22.

FIG. 22 is a conceptual view illustrating how excitation light is diffused inside the light emitting section in the transmissive light emitting device. As illustrated in FIG. 22, the excitation light with which the irradiated surface of the light emitting section is irradiated collides with the fluorescent material in the light emitting section. Accordingly, a part of the excitation light is converted into the fluorescence so as to be emitted at various angles as the fluorescence, and another part of the excitation light is reflected from the surface of the fluorescent material to various angles as excitation light. An area on the light emitting surface from which area the scattered excitation light and the fluorescence are emitted is increased because the fluorescence and the scattered excitation light are emitted (scattered) at various angles.

As another technique for the above arrangement, it is conceivable that the light emitting section is arranged to have a small size in order to prevent the increase of such an area on the light emitting surface. However, even if this technique is employed, an actual area of the light emitting point is still larger than the laser-irradiated area on the light emitting section.

The technique of Patent Literature 2 also relates to a transmissive light emitting device, and bears a problem similar to that of Patent Literature 1.

The present invention was made to solve the problem. An object of the present invention is to provide a light emitting device, an illumination device, and a vehicle headlamp each of which makes it possible to obtain a white light source highly efficiently, and project the obtained white illumination light highly efficiently.

Solution to Problem

In order to attain the object, a light emitting device of the present invention is a light emitting device capable of emitting white light, including: an excitation light source for emitting blue excitation light; a light emitting section for generating fluorescence by being irradiated with the blue excitation light; and a light-projecting section for projecting the fluorescence generated from the light emitting section, the light-projecting section being disposed on an irradiated surface side, the irradiated surface being a surface of the light emitting section which surface is irradiated with the blue excitation light.

Advantageous Effects of Invention

The arrangement makes it possible to realize a light emitting device which makes it possible to obtain a white point light source highly efficiently, and project the obtained white illumination light highly efficiently.

Figure 3:
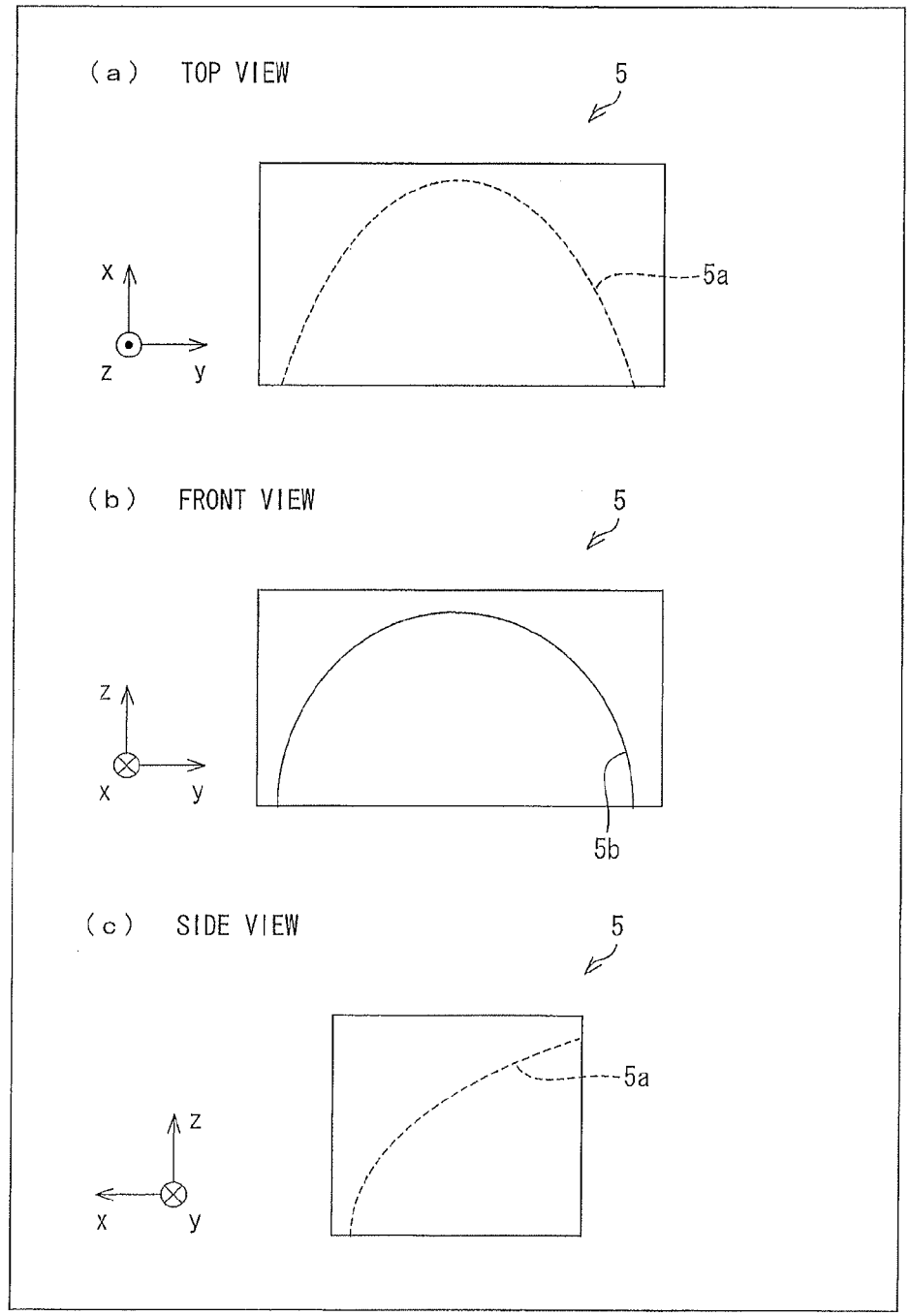

(a) of FIG. 3 is a top view of the parabolic mirror. (b) of FIG. 3 is a front view of the parabolic mirror. (c) of FIG. 3 is a side view of the parabolic mirror.

Figure 4:
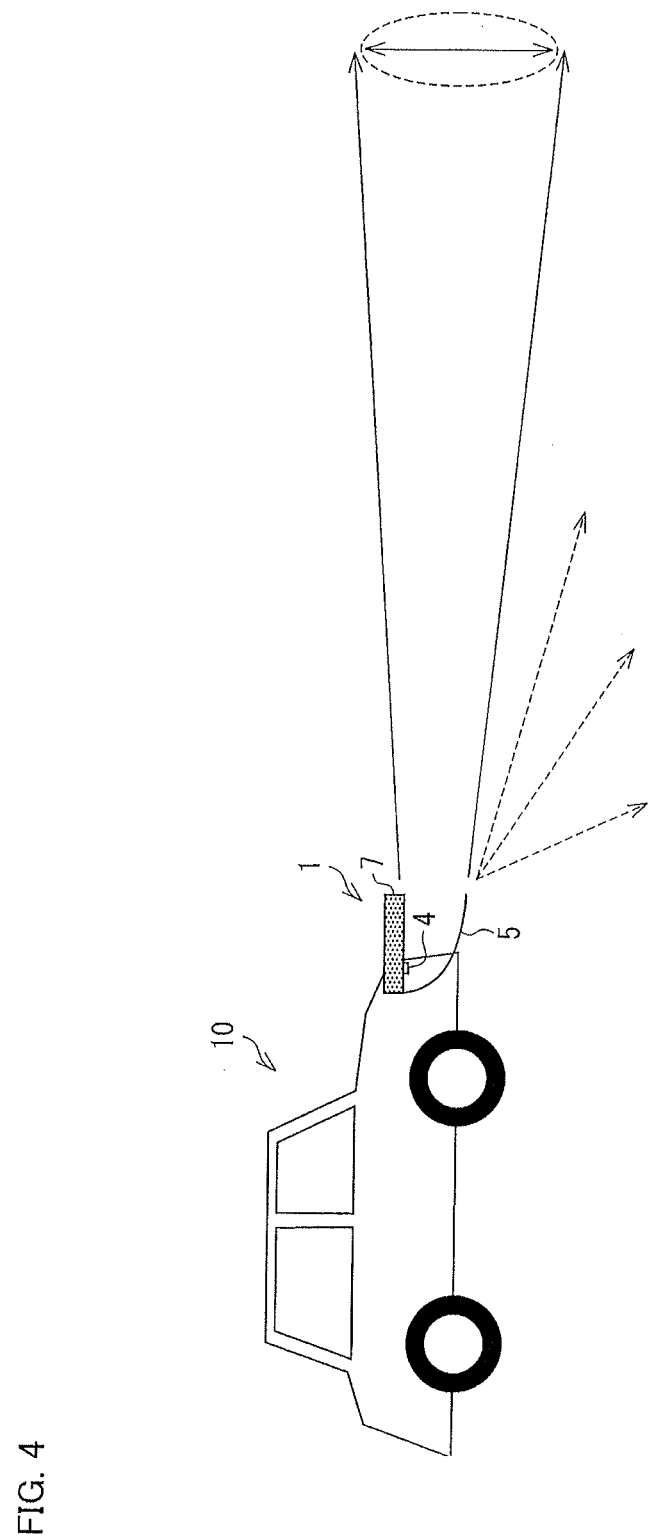

FIG. 4 is a conceptual view illustrating a direction in which a headlamp is provided in an automobile.

Figure 5:
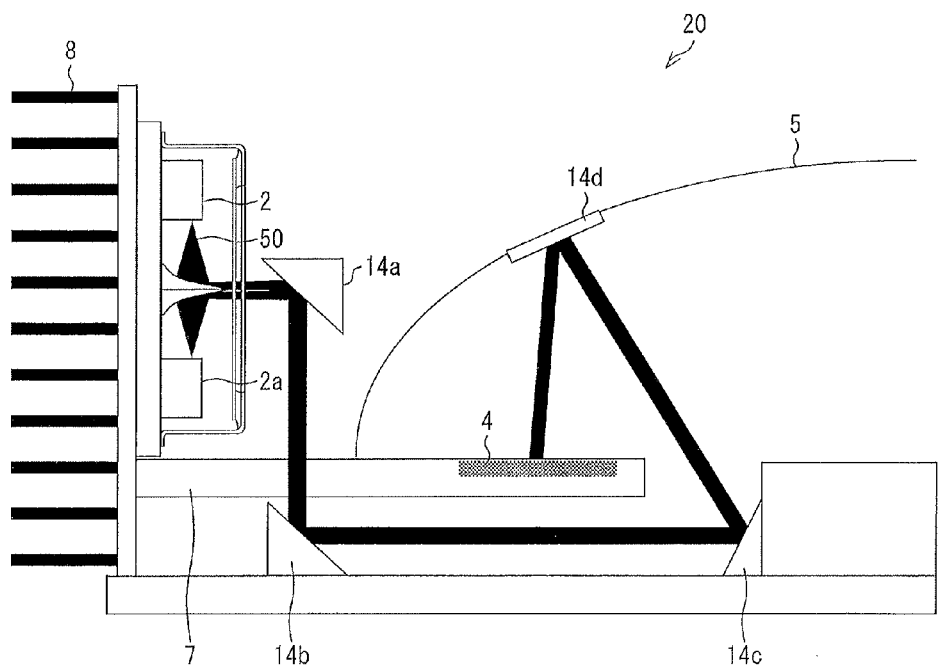

FIG. 5 is a conceptual view illustrating an illumination device of one example of the present invention.

Figure 6:
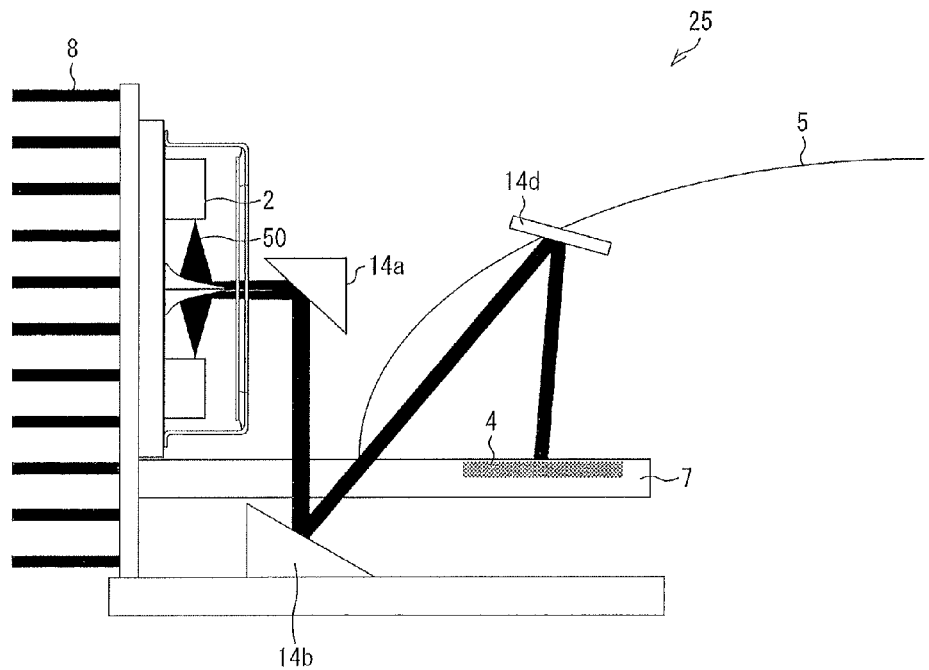

FIG. 6 is a conceptual view illustrating an illumination device of the one embodiment of the present invention.

Figure 7:
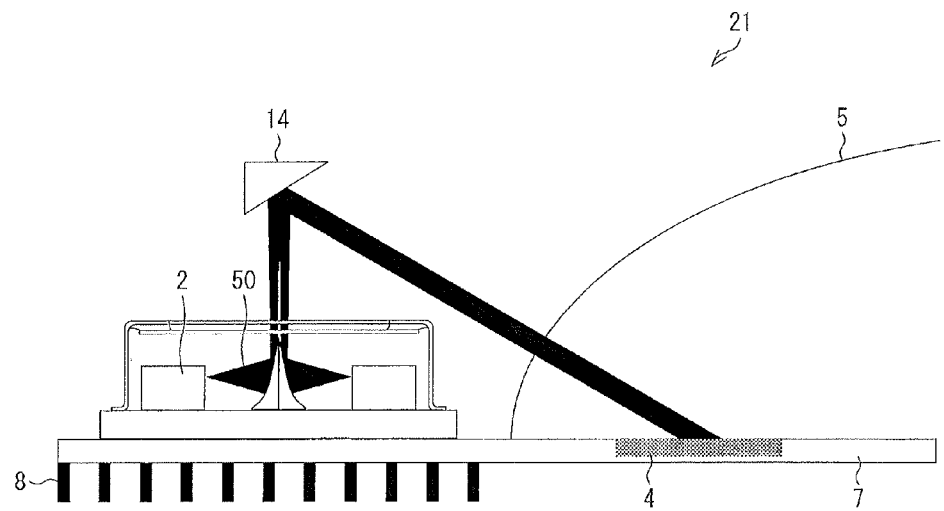

FIG. 7 is a conceptual view illustrating an illumination device of another example of the present invention.

Figure 8:
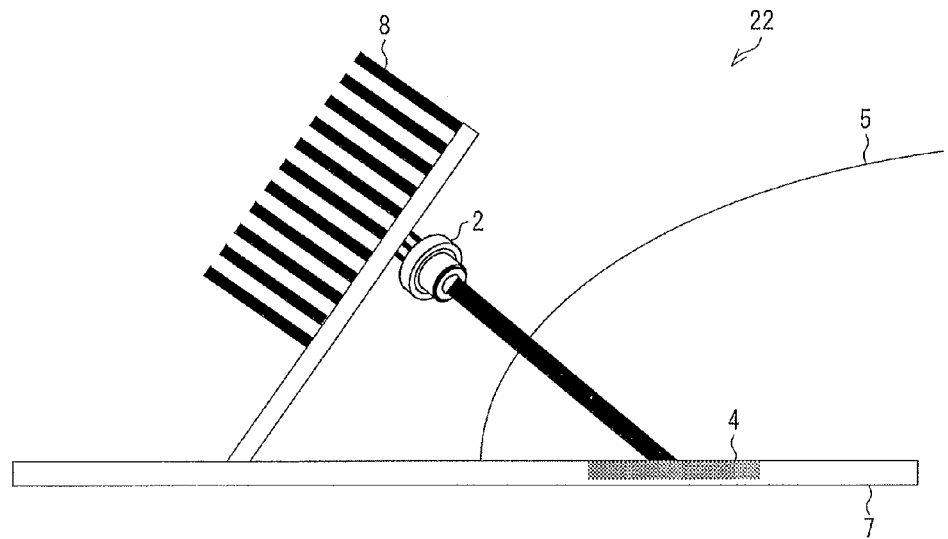

FIG. 8 is a conceptual view illustrating an illumination device of another example of the present invention.

Figure 9:
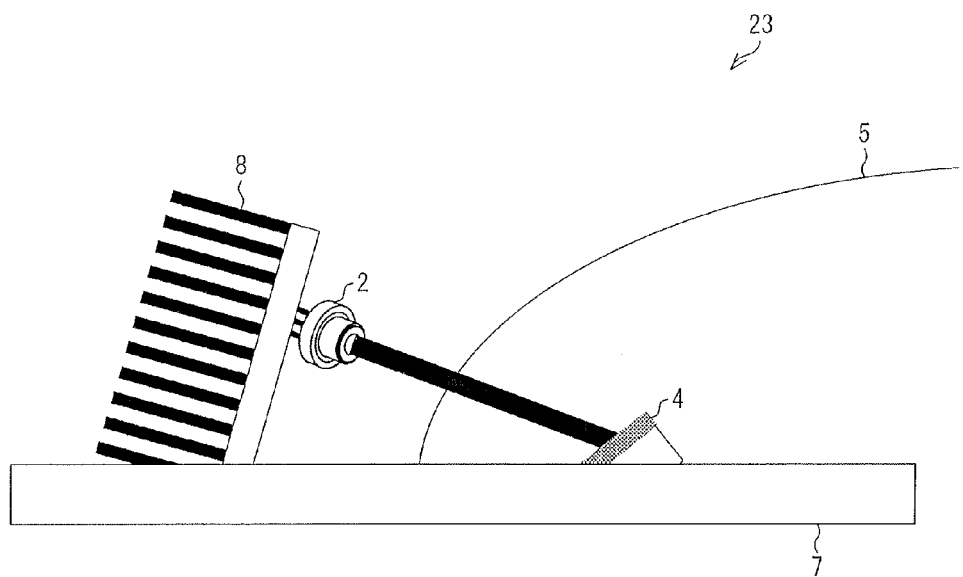

FIG. 9 is a conceptual view illustrating an illumination device of another example of the present invention.

Figure 10:
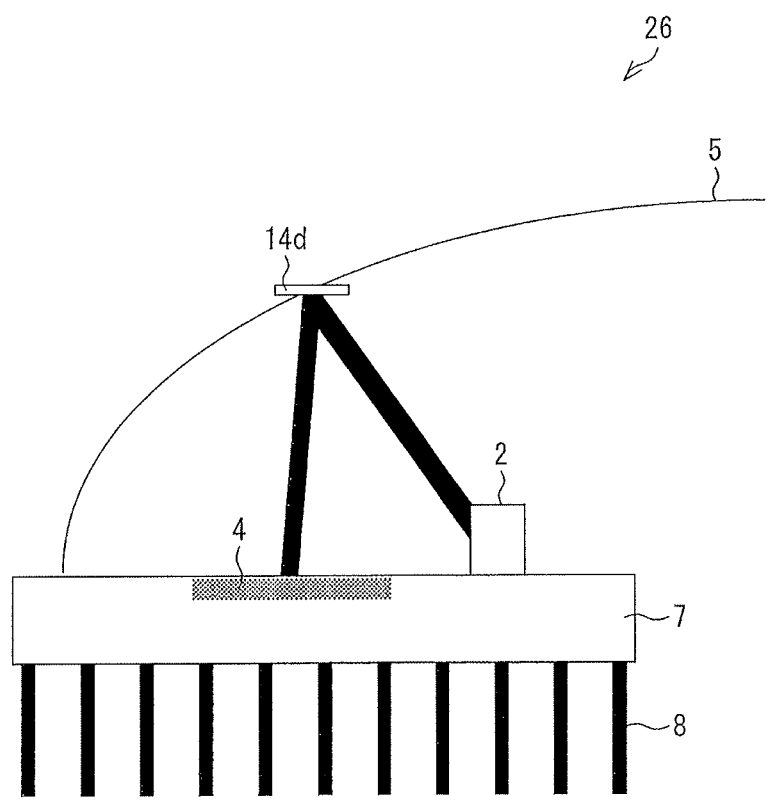

FIG. 10 is a conceptual view illustrating an illumination device of another example of the present invention.

Figure 11:
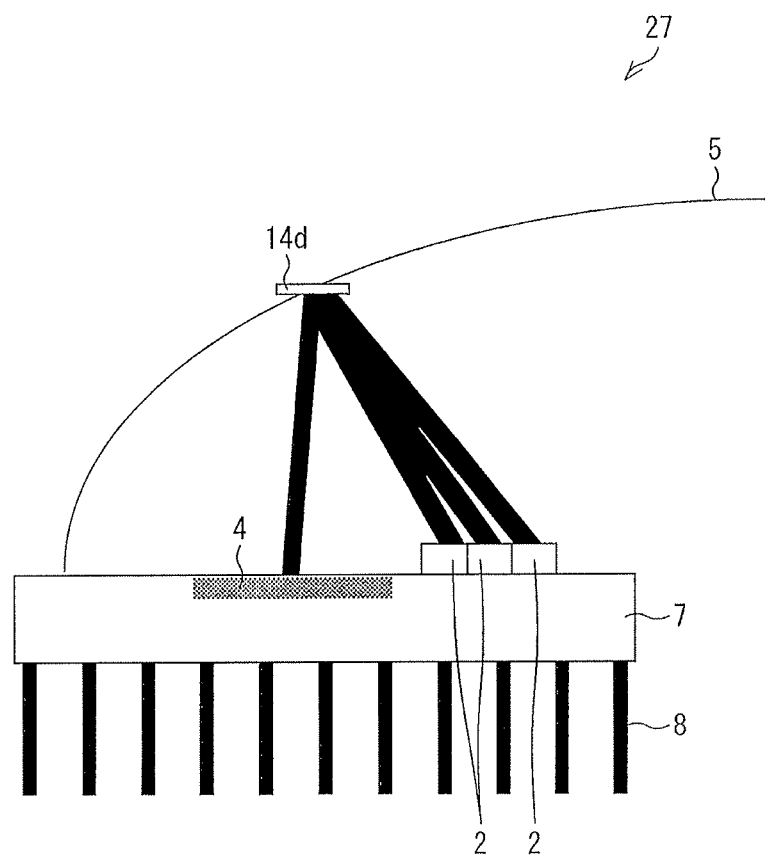

FIG. 11 is a conceptual view illustrating an illumination device of another example of the present invention.

Figure 12:
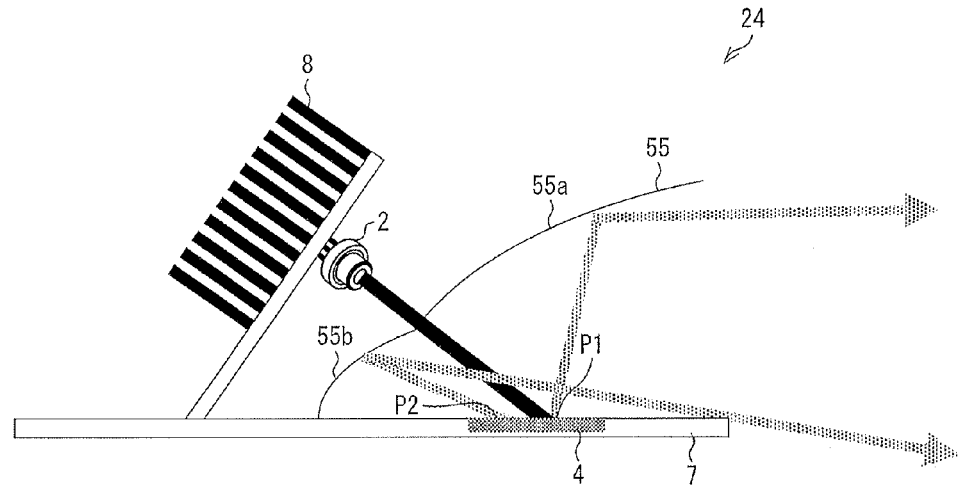

FIG. 12 is a conceptual view illustrating an illumination device of another example of the present invention.

Figure 13:
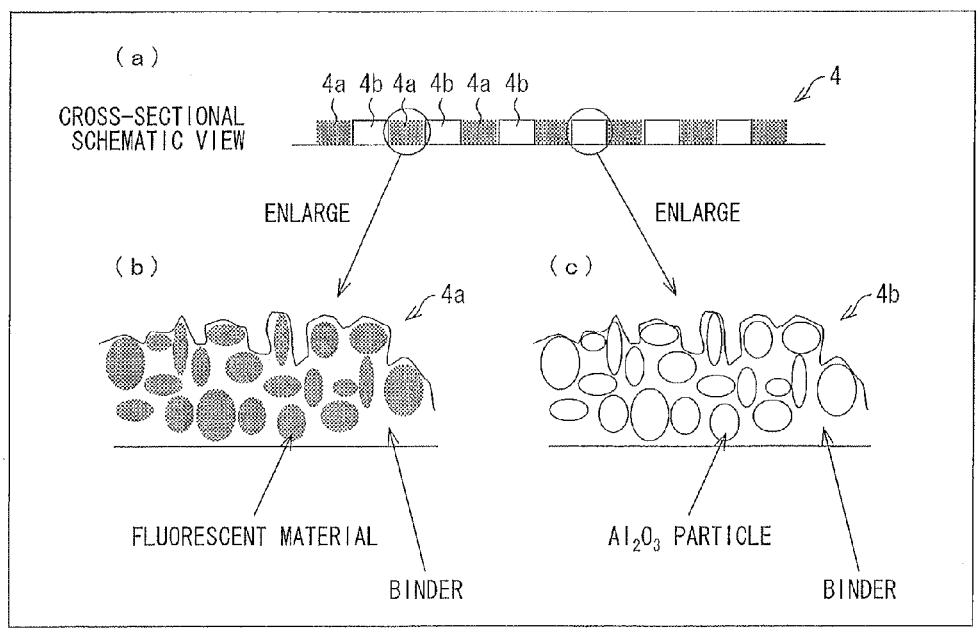

FIG. 13 is a conceptual view illustrating an example of a light emitting section of the present invention. (a) of FIG. 13 is a cross-sectional schematic view illustrating the light emitting section. (b) of FIG. 13 is an enlarged view of a fluorescent section. (c) of FIG. 13 is an enlarged view of a transparent particle section 4b.

Figure 14:
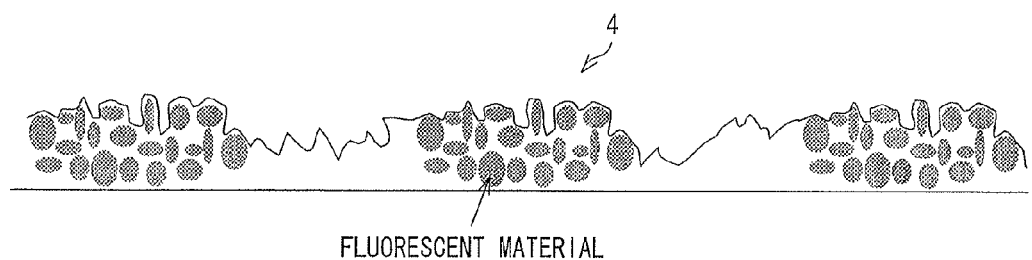

FIG. 14 is a conceptual view illustrating another example of the light emitting section of the present invention.

Figure 15:
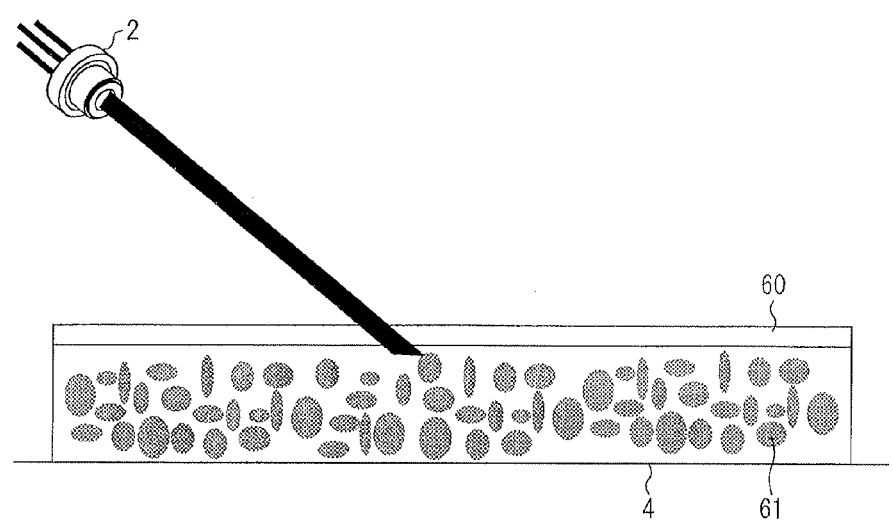

FIG. 15 is a conceptual view illustrating another example of the light emitting section of the present invention.

Figure 16:
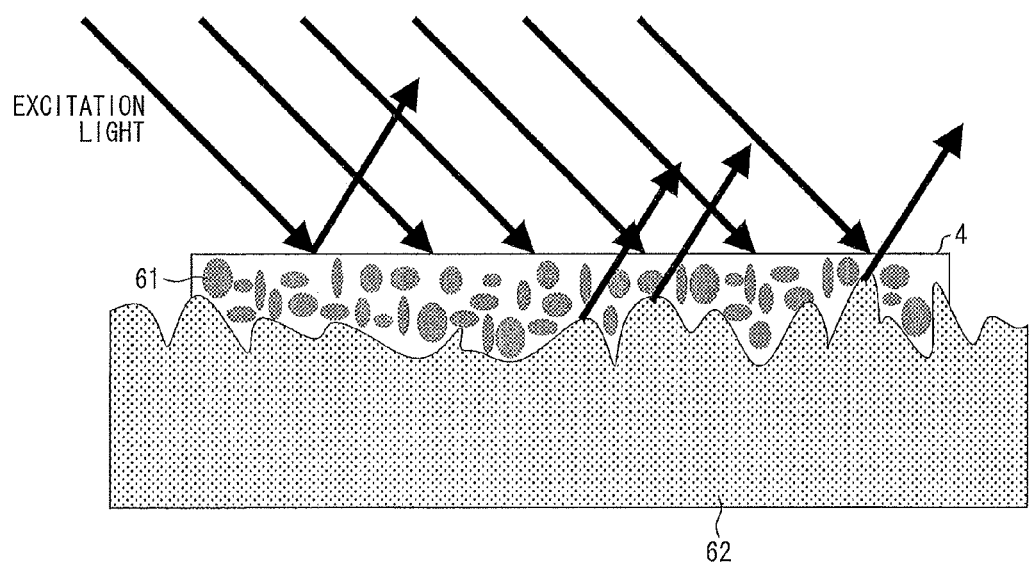

FIG. 16 is a view illustrating how surface roughness is provided on a surface of a substrate on which the light emitting section is placed.

Figure 17:
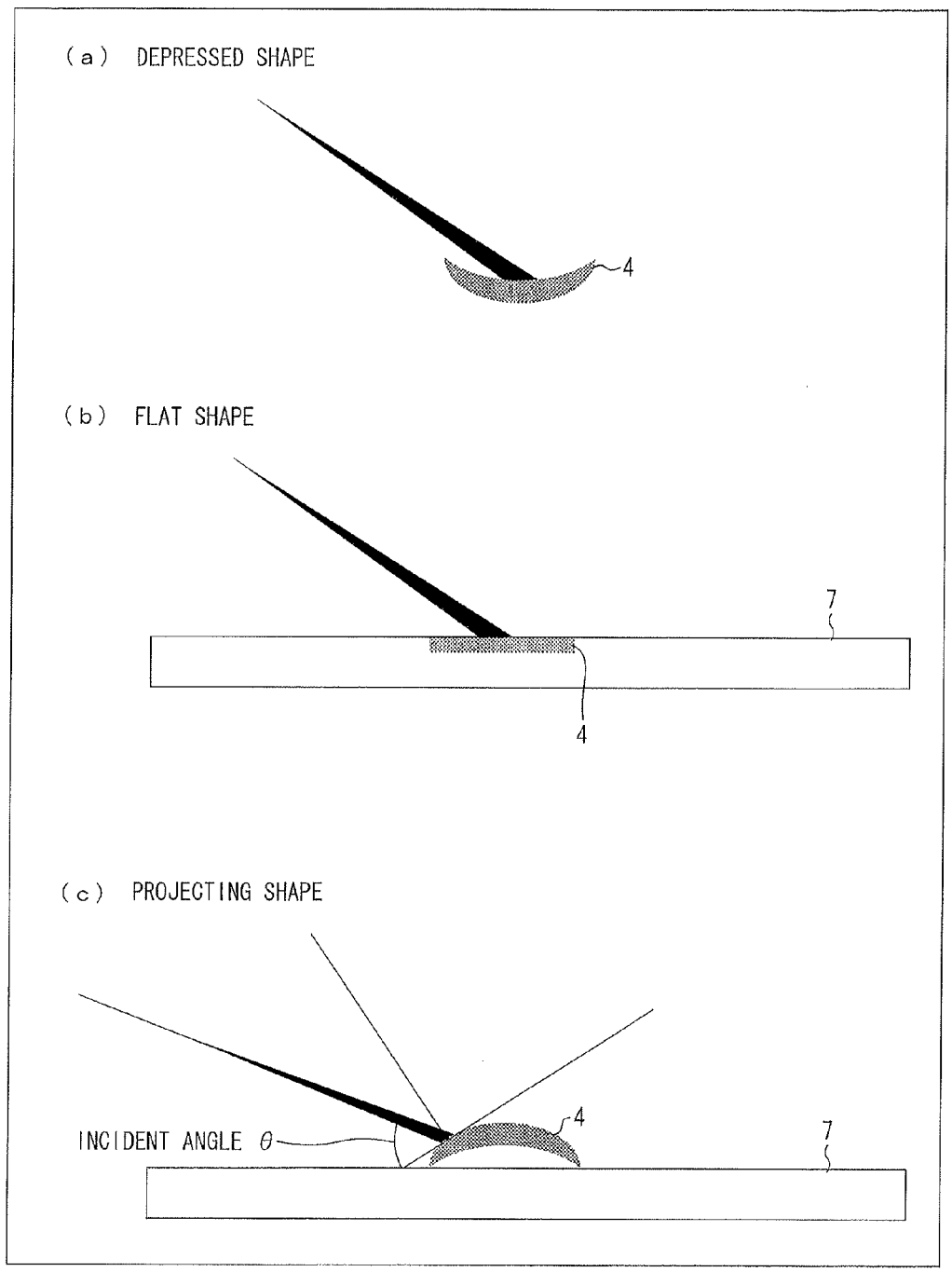

FIG. 17 is a conceptual view illustrating another example of the light emitting section of the present invention. (a) of FIG. 17 is a conceptual view illustrating a case where an irradiated surface of the light emitting section has a depressed shape. (b) of FIG. 17 is a conceptual view illustrating a case where the irradiated surface has a flat shape. (c) of FIG. 17 is a conceptual view illustrating a case where the irradiated surface has a projecting shape.

Figure 18:
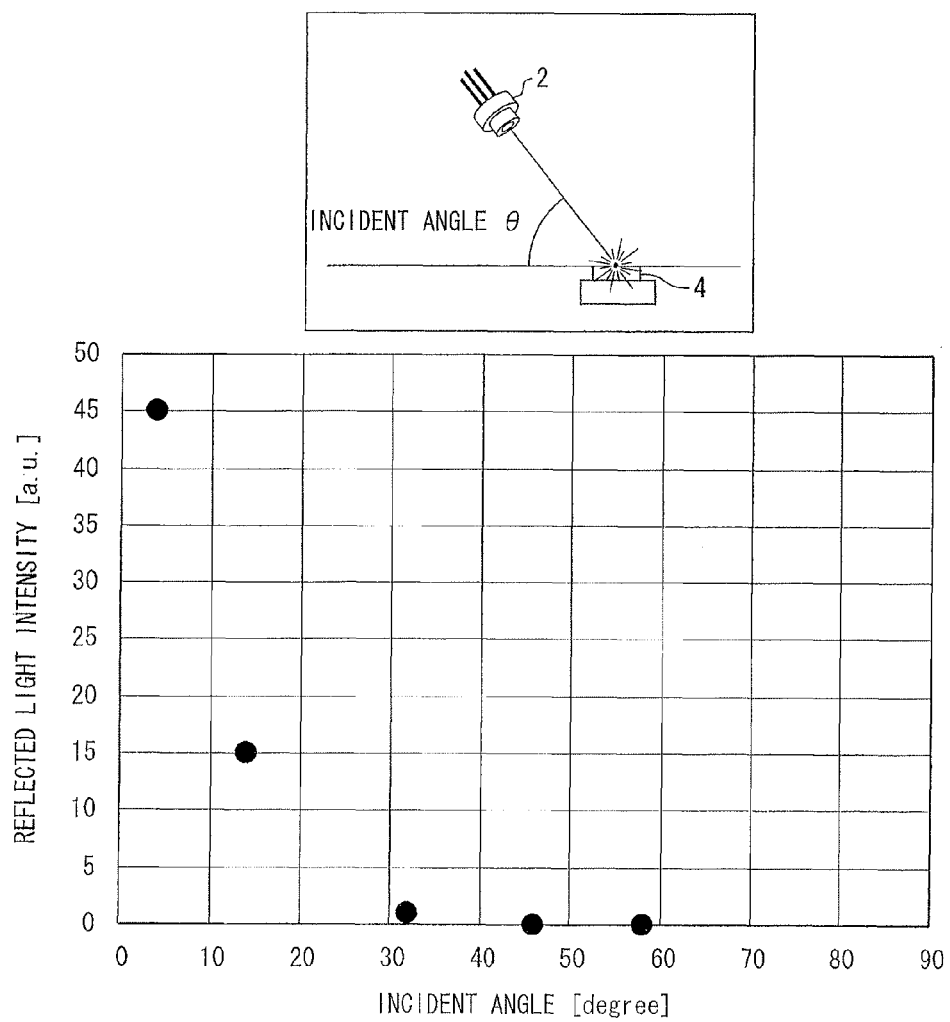

FIG. 18 is a graph showing relationships between incident angles of a laser beam with respect to the irradiated surface of the light emitting section and light intensities of specularly-reflected light.

Figure 19:
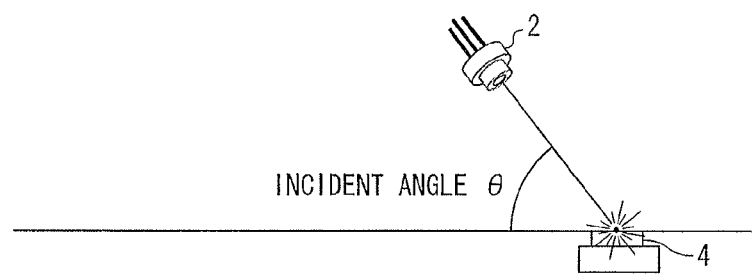
Figure 19:
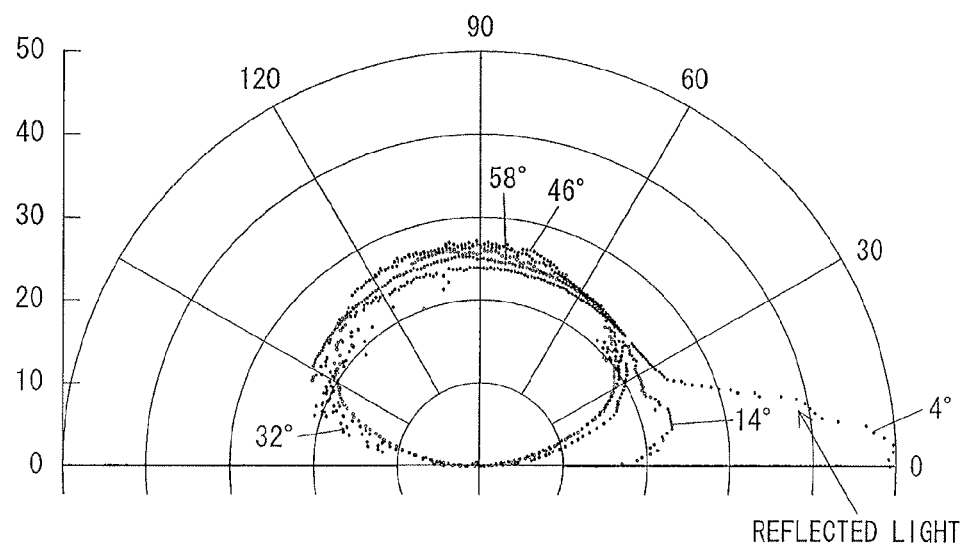

FIG. 19 is a view showing light distribution characteristics for different incident angles of the laser beam with respect to the irradiated surface of the light emitting section.

Figure 20:
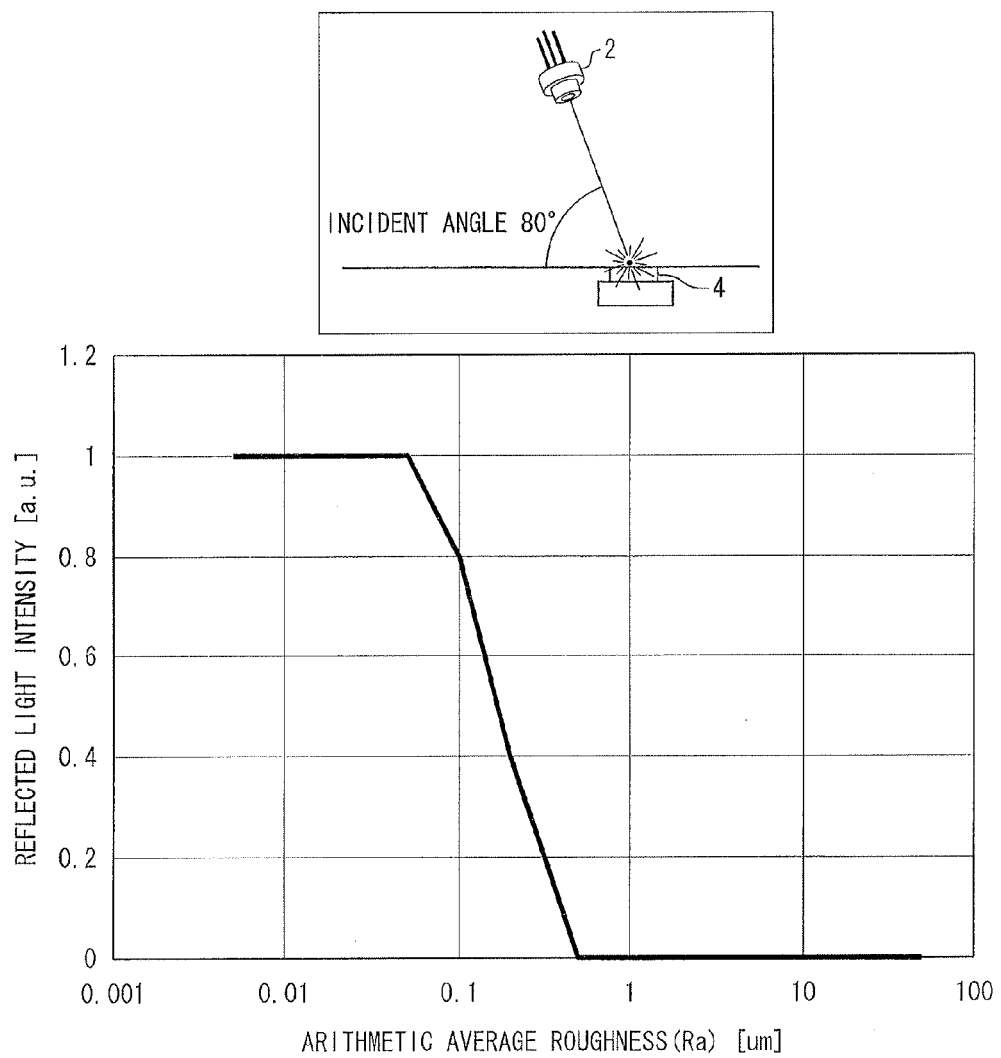

FIG. 20 is a graph showing relationships between arithmetic average roughnesses (Ra) of the irradiated surface of the light emitting section and intensities of the reflected light, for an incident angle of 80° of the laser beam with respect to the irradiated surface.

Figure 21:
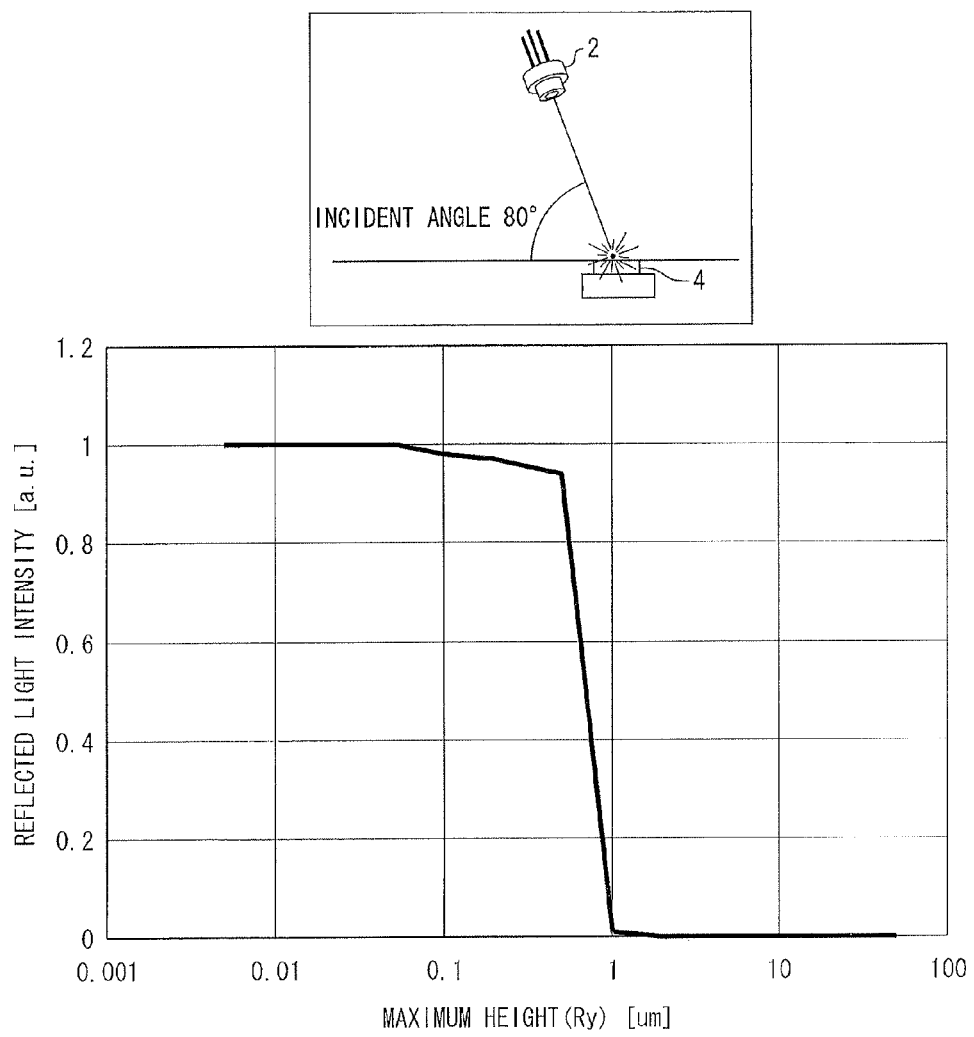

FIG. 21 is a graph showing relationships between maximum heights (Ry) of the irradiated surface of the light emitting section and intensities of the reflected light, for an incident angle of 80° of the laser beam with respect to the irradiated surface.

Figure 22:
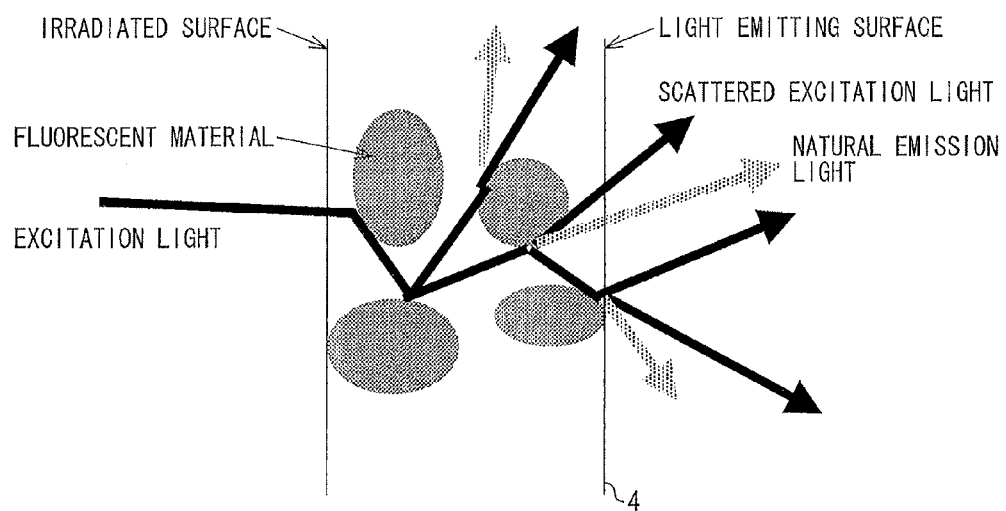

FIG. 22 is a conceptual view illustrating how excitation light is diffused inside the light emitting section in a conventional light emitting device.

Figure 23:
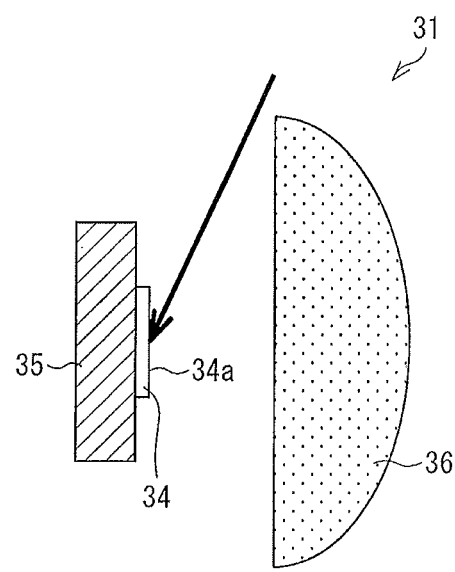

FIG. 23 is a conceptual view illustrating an arrangement of a headlamp which includes a projector lens as a light-projecting section.

Figure 24:
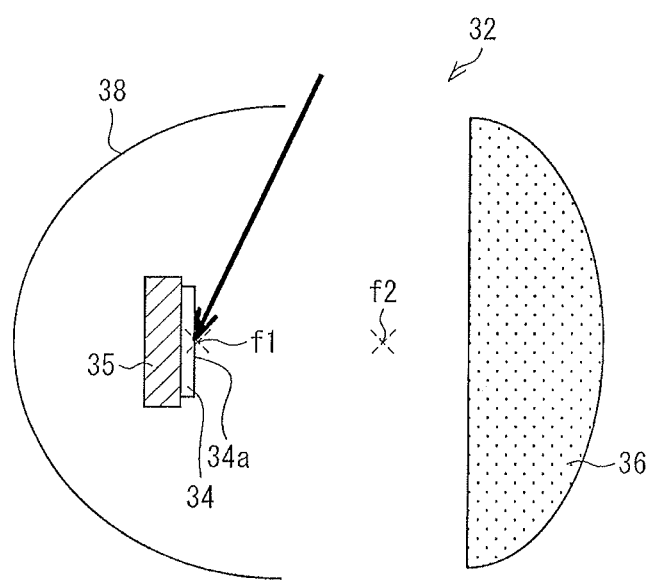

FIG. 24 is a conceptual view illustrating another arrangement of the headlamp which includes a projector lens as the light-projecting section.

DESCRIPTION OF EMBODIMENTS

The following describes an illumination device 1 etc. of the present embodiment, with reference to drawings. In the description below, identical parts or identical components are given common reference signs, and have an identical name and an identical function. The following does not repeatedly describe such parts or components in detail.

Figure 1:
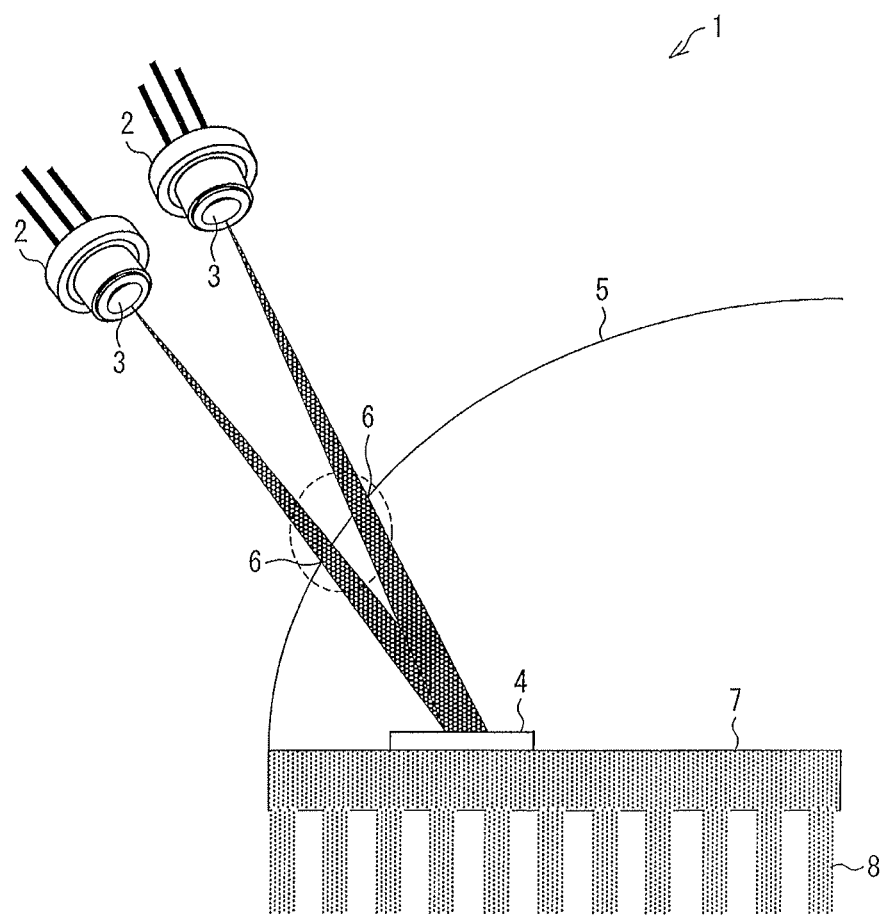
FIG. 1 is a cross-sectional view illustrating a schematic arrangement of an illumination device of one embodiment of the present invention.

The following describes one embodiment of the present invention, with reference to FIG. 1 etc.

[Arrangement of Illumination Device 1]

FIG. 1 is a cross-sectional view illustrating a schematic arrangement of an illumination device 1 of the one embodiment of the present invention. As illustrated in FIG. 1, the illumination device 1 includes: laser elements (excitation light sources, laser diodes) 2, lenses 3, a light emitting section 4, a parabolic mirror (light-projecting section) 5, and a metal base 7.

In order to solve the problem of the conventional techniques, namely, in order to increase efficiency, the present invention is characterized as below.

The light emitting section 4 containing a fluorescent material is arranged to have a single surface serving as both a surface for being irradiated with an excitation laser beam and a surface for emitting the florescence. This makes it possible to dissolve the conventional problem of increase of a light emitting area due to an effect of the scattering of fluorescence and scattered excitation light. This makes it possible to obtain a white light source with ultrahigher luminance.

Further, the parabolic mirror (light-projecting section) 5 is provided so as to face that surface of the light emitting section 4 which is irradiated with the laser beam so as to emit the fluorescence. This makes it possible to restrict more efficiently, to one direction, a direction in which the white light emitted from the light emitting section 4 is projected. This remarkably increases an efficiency of utilization of the white light.

According to the present invention, further, blue is selected as a wavelength of the excitation laser beam, and a white color is obtained by mixing (i) a blue laser beam which has been scattered without making contribution to the excitation of the fluorescent material with (ii) the fluorescence emitted from the fluorescent material. This makes it possible to remarkably increase an efficiency of utilization of energy of the laser beam.

Further, since that surface of the light emitting section 4 which is opposite to the laser-irradiated surface is not directly involved in emission of the white light, the present invention may be more preferably arranged such that a heat sink made from a metal having a high thermal conductivity is provided, entirely on that surface of the light emitting section 4 which is opposite to the laser-irradiated surface. This makes it possible to efficiently release heat generated from the light emitting section 4. This eliminates decrease in emission efficiency of the fluorescence even in a strongly-excited state caused by a laser beam. This also makes it possible to reflect, on the metal surface, excitation laser beam which has passed through the light emitting section 4, so as to reuse the excitation laser beam. This makes it possible to increase an efficiency of utilization of energy of the laser beam. In particular, one embodiment of present invention is such that a fluorescent material having a small thickness is provided on the flat metal surface.

The following shows arrangement examples of the sections of the illumination device 1.

(Laser Element 2)

The laser element 2 is a light emitting element functioning as an excitation light source for emitting excitation light. Instead of one laser element 2, a plurality of laser elements 2 may be provided. In this case, each of the plurality of laser elements 2 emits a laser beam as excitation light. Only one laser element 2 may be used, however, the use of the plurality of laser elements 2 makes it possible to easily obtain a high-output laser beam.

The laser element 2 may include one light emitting point on one chip, and alternatively, may include a plurality of light emitting points on one chip. The laser beam to be emitted from the laser element 2 has a wavelength of 450 nm (blue), for example. However, it is possible to select a laser beam having a wavelength in a blue wavelength region of not less than 420 nm but not more than 490 nm. Further, a laser beam may be appropriately selected according to a type of the fluorescent material contained in the light emitting section 4 (in the present invention, a wavelength range of not less than 420 nm but not more than 490 nm is defined as a "blue" wavelength range).

(Lens 3)

The lens 3 adjusts (for example, extends) an irradiation range of a laser beam so that the light emitting section 4 is appropriately irradiated with the laser beam emitted from the laser element 2. The lens 3 is provided in each laser element 2.

(Light Emitting Section 4)

The light emitting section 4 emits fluorescence by receiving a laser beam emitted from the laser element 2 and includes a fluorescent material for radiating light by receiving a laser beam. Specifically, the light emitting section 4 may be prepared by dispersing a fluorescent material in a sealing material or solidifying a fluorescent material. The light emitting section 4 can be called a wavelength conversion element because the light emitting section 4 converts a laser beam into fluorescence.

The light emitting section 4 is placed on the metal base 7, at a substantial focal point of the parabolic mirror 5. Accordingly, an optical path of the fluorescence emitted from the light emitting section 4 is controlled by being reflected on a reflecting curved-surface of the parabolic mirror 5.

Examples of the fluorescent material of the light emitting section 4 encompass oxynitride fluorescent material (such as a SiAlON fluorescent material) or III-V compound semiconductor nanoparticle fluorescent material (such as indium phosphide: InP). These fluorescent materials each have high thermal tolerance against a high-output laser beam (and/or a high light density) emitted from the laser element 2, so that the fluorescent materials are quite suitable for a laser illumination light source. Note that a fluorescent material of the light emitting section 4 is not limited thereto but other fluorescent materials may be employed.

For example, white light can be obtained in such a manner that a yellow fluorescent material (or, a green or red fluorescent material) is contained in the light emitting section 4, and the light emitting section 4 is irradiated with a laser beam having a wavelength near 450 nm (blue; in the present invention, the white light can be obtained by irradiating the light emitting section 4 with a laser beam in a wavelength range of not less than 420 nm but not more than 490 nm.

A sealing material for the light emitting section 4 may be, for example, a glass material (inorganic glass, organic or inorganic hybrid glass) or a resin material such as a silicone resin. As the glass material, a low-melting glass may be used. The sealing material is preferably a material having a high transparency. In the case of a high-output laser beam, a sealing material having a high heat resistance is preferably used.

In a case where the white light is obtained by exciting the fluorescent material by use of a laser diode or the like, conceivable are combinations of various excitation wavelengths and various fluorescent materials. However, the white light can also be obtained as below. That is, the fluorescent material is excited by using blue light as an excitation light source so that the fluorescence emitted from the fluorescent material is utilized as a light component of the illumination light. Further, by scattering also a component of the blue light which component does not contribute to the excitation of the fluorescent material, the component is utilized as a light component of the illumination light so that the white light is obtained by mixing the scattered blue light and the fluorescence emitted from the fluorescent material. The white light thus obtained is used as white illumination light. This makes it possible to realize white illumination highly efficiently. As a result of study, the inventors of the present invention found that the white light can be obtained more efficiently by obtaining the fluorescence and the scattered blue light from that surface of the light emitting section 4 which is irradiated with the excitation light.

(Parabolic Mirror 5)

The parabolic mirror 5 reflects the fluorescence emitted from the light emitting section 4 so as to form a bundle of rays (illumination light) which travels within a predetermined solid angle. The parabolic mirror 5 may be, for example, a member having a surface on which a metal thin film is formed, or a member made of metal.

Figure 2:
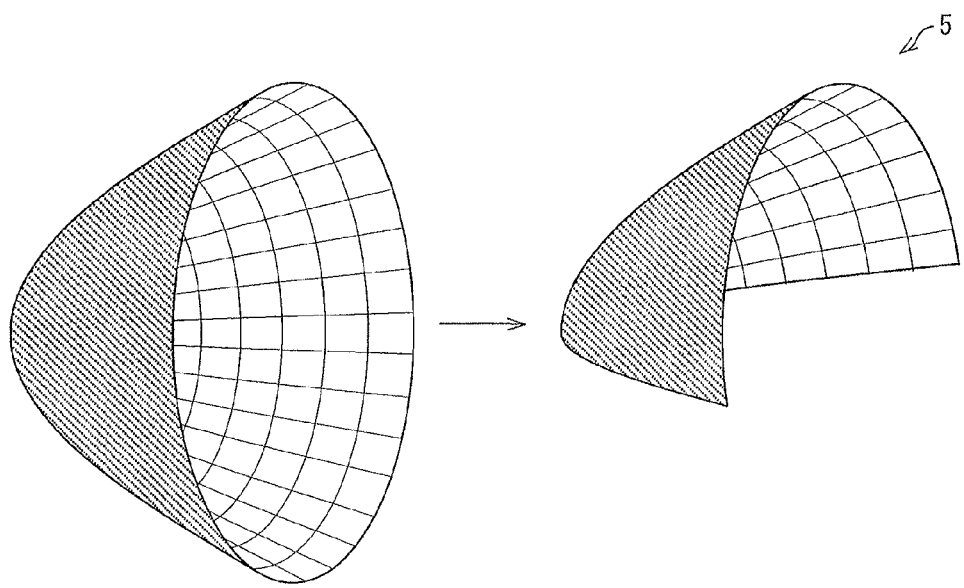
FIG. 2 is a conceptual view illustrating a paraboloid of revolution of a parabolic mirror.

FIG. 2 is a conceptual view of a paraboloid of revolution of the parabolic mirror 5. (a) of FIG. 3 is a top view of the parabolic mirror 5, (b) of FIG. 3 is a front view thereof, and (c) of FIG. 3 is a side view thereof. In order to illustrate these figures intelligibly, (a) to (c) of FIG. 3 illustrate an example where a parabolic mirror 5 is formed under a state in which inside of a rectangular parallelepiped member is hollowed out.

As illustrated in FIG. 2, the parabolic mirror 5 includes, in its reflection surface, at least a part of a partially curved-surface which has a shape obtainable in such a manner that a curved surface (parabolic curved surface) formed by rotating a parabola about a rotation axis which is a symmetric axis of the parabola is cut off along a plane including the rotation axis. In (a) to (c) of FIG. 3, the parabolic curved surface is indicated by a curved line 5a. Further, as illustrated in (b) of FIG. 3, in a case where the parabolic mirror 5 is viewed from the front, an opening 5b of the parabolic mirror 5 (i.e., an exit of illumination light) has a semicircular shape.

The parabolic mirror 5 having such a shape is provided so that a part thereof faces a upper surface of the light emitting section 4 which upper surface has an area larger than the area of a side surface. That is, the parabolic mirror 5 is disposed in such a position that the parabolic mirror 5 covers the upper surface of the light emitting section 4 (i.e., disposed on a laser-irradiated surface side of the light emitting section 4). From another point of view, a part of the side surface of the light emitting section 4 faces the opening 5b of the parabolic mirror 5.

By establishing such a positional relationship between the light emitting section 4 and the parabolic mirror 5, the fluorescence emitted from the light emitting section 4 can be effectively projected within the predetermined solid angle. This makes it possible to increase utilization efficiency of the fluorescence.

The mirror does not have to necessarily be the parabolic one but may be appropriately selected according to a purpose of use of the illumination device 1. For example, the mirror may be an elliptical mirror. Alternatively, the mirror may be a multifaceted mirror or a free-curved surface mirror.

Further, the laser element 2 is placed outside the parabolic mirror 5, and the parabolic mirror 5 includes a window section 6 through which a laser beam transmits or passes. The window section 6 may be an opening or a section including a transparent member that allows the laser beam to transmit therethrough. For example, the window section 6 may be a transparent plate including a filter that allows the laser beam to transmit therethrough and reflects the white light (fluorescence from the light emitting section 4). This arrangement can prevent the fluorescence from the light emitting section 4 from leaking through the window section 6.

One common window section 6 may be provided for the plurality of laser elements 2, or a plurality of window sections 6 may be provided so that each of the window sections 6 is provided for one or more of the plurality of laser elements 2.

Note that the parabolic mirror 5 may partially include a nonparabolic part. Further, the reflection mirror included in the light-projecting section of the light emitting device of the present invention may be a parabolic mirror having a closed-circle shaped opening or may include a part of the parabolic mirror. Furthermore, the reflection mirror is not limited to a parabolic mirror, and may alternatively be an ellipsoidal mirror or a hemispherical mirror. In other words, the reflection mirror only needs to include, in its reflection surface, at least a part of a curved surface formed by rotating a pattern (ellipse, circle, or parabola) about a rotation axis of the pattern.

The inventors of the present invention found the following.

That is, the fluorescent material is excited by using blue light as an excitation light source so that the fluorescence emitted from the fluorescent material is utilized as a light component of the illumination light. Further, by scattering also a component of the blue light which component does not contribute to the excitation of the fluorescent material, the component is utilized as a light component of the illumination light so that the white light obtained by mixing the scattered blue light and the fluorescence emitted from the fluorescent material is utilized as the white illumination light. Further, the white light can be obtained more efficiently by obtaining the fluorescence and the scattered blue light from that surface of the light emitting section 4 which is irradiated with the excitation light. In a case where the white light is projected by use of a mirror having a shape such as a parabolic shape, the white light can be efficiently projected with an arrangement in which the mirror is placed so as to face that surface of the light emitting section which is irradiated with the excitation light. Thus, the inventors of the present invention found that the arrangement is suitable for an illumination device. In this case, it is preferable that the mirror has a parabolic shape in particular.

(Metal Base 7)

The metal base 7 is a plate-like support for supporting the light emitting section 4 and is made of metal (e.g., copper or iron). Hence, the metal base 7 has high thermal conductivity and therefore can effectively contribute to radiation of heat emitted from the light emitting section 4. Note that a member for supporting the light emitting section 4 may be a member containing a material having high thermal conductivity (e.g., glass or sapphire) other than metal. The member for supporting the light emitting section 4 is preferably made from a metal having a high thermal conductivity. However, a surface of the metal base 7, which surface is in contact with the light emitting section 4, preferably functions as a reflection surface. The surface functioning as a reflection surface can reflect the fluorescence and direct the fluorescence toward the parabolic mirror 5 after the laser beam incident from above the light emitting section 4 is converted into fluorescence. Furthermore, the reflection surface reflects the laser beam incident from above the light emitting section 4 to the reflection surface and directs the laser beam back to the inside of the light emitting section 4. Because the metal base 7 is covered with the parabolic mirror 5, it can be said that the metal base 7 has a surface facing the reflecting curved-surface (parabolic curved-surface) of the parabolic mirror 5. It is preferable that the surface of the metal base 7 on which the light emitting section 4 is provided is substantially in parallel to the rotation axis of the paraboloid of revolution of the parabolic mirror 5 and substantially includes the rotation axis.

(Fin 8)

The fin 8 functions as a cooling section (mechanism of heat radiation) for cooling the metal base 7. The fin 8 includes a plurality of heat sinks, and these heat sinks increase an area in contact with air, to thereby improve heat radiation efficiency. The cooling section for cooling the metal base 7 only needs to have a cooling (heat radiation) function, so that a cooling section including a heat pipe or a cooling section having a water-cooling system or an air-cooling system may be used. The inventors of the present invention further found the following.

That is, the fluorescent material is excited by using blue light as an excitation light source so that the fluorescence emitted from the fluorescent material is utilized as a light component of the illumination light. Further, by scattering also a component of the blue light which component does not contribute to the excitation of the fluorescent material, the component is utilized as a light component of the illumination light so that the white light obtained by mixing the scattered blue light and the fluorescence emitted from the fluorescent material is utilized as the white illumination light. Further, the white light can be obtained more efficiently by obtaining the fluorescence and the scattered blue light from that surface of the light emitting section 4 which is irradiated with the excitation light. In the highly-efficient white light source, a flat metal member is disposed on that surface of the light emitting section 4 which is opposite to its surface to be irradiated with the excitation light. This makes it possible to effectively release heat generated from the fluorescent material. This makes it possible to maintain a high efficiency even in a strongly-excited state. The above is the finding of the inventors of the present invention.

The arrangement above makes it possible to obtain a point light source with high luminance which emits light particularly efficiently, and also makes it possible to project the white light efficiently.

[How to Provide Illumination Device 1]

FIG. 4 is a conceptual view illustrating a direction in which the illumination device 1 is provided in a case where the illumination device 1 is used for an automobile headlamp (headlamp). As illustrated in FIG. 4, the illumination device 1 may be provided to a head of an automobile 10 so that the parabolic mirror 5 is positioned on the lower side of the illumination device 1 in the vertical direction. By providing the illumination device 1 in the aforementioned way, the illumination device 1 not only brightly illuminates a forward direction of the automobile 10, but also dimly illuminates an area in lower front of the automobile 10 due to a light-projection characteristic of the parabolic mirror 5.

Note that the illumination device 1 may be used as a driving headlamp (high beam) for an automobile, or may be used as a passing headlamp (low beam). Further, during driving of the automobile 10, light intensity distribution of a laser beam which irradiates the laser-irradiated surface of the light emitting section 4 may be controlled in accordance with a driving state. This makes it possible to project light having an arbitrary light-projection pattern during driving of the automobile 10, and therefore the illumination device 1 can be more convenient for a user.

[Application Example of the Present Invention]

The illumination device of the present invention may be used not only in a vehicle headlamp but also in another illumination device. The illumination device of the present invention may be accomplished as a headlamp for a moving object other than a vehicle (e.g., human, ship, aircraft, submarine, or rocket), or may be accomplished as interior lighting equipment (e.g., stand lamp) other than a searchlight, a projector, and a downlight.

[Example of Illumination Device]

The following describes a more concrete example of the illumination device of the present invention, with reference to FIG. 5 etc. Members which are the same as those described above are given common reference signs, and the following omits to describe such members. Also, in the following description, materials, forms, and various kinds of numeral values are merely examples, and therefore do not limit the present invention.

[Example 1 of Illumination Device]

FIG. 5 is a conceptual view illustrating an illumination device 20 of one example of the present invention. As illustrated in FIG. 5, the illumination device 20 includes a plurality of laser elements 2, a light emitting section 4, a parabolic mirror 5, a metal base 7, a fin 8, reflection mirrors 14a, 14b, 14c, and 14d, and a flux-making mirror 50.

Laser beams emitted from emission end sections of the laser elements 2 (2 and 2a) are made into a flux of laser beam and directed (reflected) toward the reflection mirror 14a by the flux-making mirror 50. Then, the laser beam reflected on the reflection mirror 14a is sequentially reflected on the reflection mirrors 14b, 14c, and 14d so as to be guided to the light emitting section 4. Although the number of the reflection mirrors is four in the present example, the number may be five or more, or three or less, depending on positions of the laser elements 2 and the light emitting section 4.

(Details of Laser Elements 2)

Each of the laser elements 2 is an element with 1 W output for emitting a laser beam having a wavelength of 405 nm, and in this example, six laser elements 2 are provided in total. Therefore, gross output of laser beams is 6 W.

(Details of Light Emitting Section 4)

In the light emitting section 4, two kinds of fluorescent materials are mixed so as to emit white light. The fluorescent materials are a red fluorescent material $CaAlSiN_3$:Eu and a green fluorescent material $\beta$-SiAlON:Eu. Respective powders of the fluorescent materials are sintered so as to be hardened.

By way of example, the light emitting section 4 has a disc-like shape having a diameter of 2 mm and a thickness of 0.2 mm.

(Details of Parabolic Mirror 5)

The opening 5b of the parabolic mirror 5 has e.g. a semi-circular shape having a radius of 15 mm. The parabolic mirror 5 has a depth of e.g. 30 mm. The light emitting section 4 is positioned at a substantial focal point of the parabolic mirror 5. The fluorescence has a Lambertian distribution, and a total luminous flux of the fluorescence is 2000 lm.

(Details of Metal Base 7)

The metal base 7 is made of copper. Aluminum is deposited on a surface of the metal base 7 on which the light emitting section 4 is to be placed. The fin 8 is provided on a side surface of the metal base 7. The metal base 7 and the fin 8 may be formed integrally. The fin 8 is not necessarily required.

The illumination device 20 in FIG. 5 can be downsized by, e.g., reducing its parts as illustrated in FIG. 6. That is, an illumination device 25 in FIG. 6 has three reflection mirrors as a result of adjustment of an angle and disposition of the reflection mirrors. That is, the four reflection mirrors necessary for the illumination device 20 in FIG. 5 are reduced to three. Thus, the illumination device can be downsized by reducing the parts through modification of an arrangement of the reflecting device.

[Example 2 of Illumination Device]

FIG. 7 is a conceptual view illustrating an illumination device 21 of another example of the present invention. As illustrated in FIG. 7, the illumination device 21 includes a plurality of laser elements 2, a light emitting section 4, a parabolic mirror 5, a metal base 7, a fin 8, a reflection mirror 14, and a redirection mirror 50.

A major difference between the present example and Example 1 is that only a single reflection mirror 14 is provided, and a laser beam reflected on the reflection mirror 14 is guided to the light emitting section 4 via a window section 6 of the parabolic mirror 5.

Thus, the illumination device 21 can be arranged differently from that of Example 1, depending on a direction etc. of the laser beam reflected on the reflection mirror 14 after being reflected on the redirection mirror 50.

[Example 3 of Illumination Device]

FIG. 8 is a conceptual view illustrating an illumination device 22 of another example of the present invention. As illustrated in FIG. 8, the illumination device 22 includes a laser element 2, a light emitting section 4, a parabolic mirror 5, a metal base 7, and a fin 8.

A major difference between the present example and Example 2 is that a single laser element 2 is provided, and accordingly, without the use of the reflection mirror 14, the light emitting section 4 is directly irradiated with the laser beam emitted from the laser element 2. The parabolic mirror 5 has the window section 6 (not illustrated). The laser beam is guided to the light emitting section 4 via the window section 6. Since only the single laser element 2 is provided, a total luminous flux is 250 lm, which is lower than that of Example 2.

[Example 4 of Illumination Device]

FIG. 9 is a conceptual view illustrating an illumination device 23 of another example of the present invention. As illustrated in FIG. 9, the illumination device 23 includes a laser element 2, a light emitting section 4, a parabolic mirror 5, a metal base 7, and a fin 8.

A major difference between the present example and Example 3 is that the light emitting section 4 forms a certain angle with respect to the metal base 7. With the arrangement, the illumination device 23 makes it possible to introduce the laser beam at an angle closer to the horizontal, as compared to FIG. 8. This makes it possible to reduce an inner volume of a rear section of the parabolic mirror 5. This allows a lightweight compact design of the whole system. Further, even if someone looks inside the parabolic mirror 5 by the naked eye via the opening 5b of the parabolic mirror 5, he does not directly see that part of the light emitting section 4 which has a higher luminance by being irradiated with the laser beam. This leads to a safety advantage in that no retina damage etc. is caused.

The arrangements illustrated in FIGS. 8 and 9 may be e.g. an arrangement of an illumination device 26 illustrated in FIG. 10 where a single heat sink serves as both a heat sink for a light emitting section 4 and a heat sink for the laser element 2. In this case, further downsizing can be achieved. Such an arrangement can also be applied to an arrangement illustrated in FIG. 11 (illumination device 27) where a plurality of laser elements 2 are provided.

[Example 5 of Illumination Device]

FIG. 12 is a conceptual view illustrating an illumination device 24 of another example of the present invention. As illustrated in FIG. 12, the illumination device 24 includes a laser element 2, a light emitting section 4, a parabolic mirror 5, a metal base 7, and a fin 8.

A major difference between the present example and Example 3 is a shape of a combined mirror 55. The combined mirror 55 is made by combining a parabolic mirror 55a and an ellipsoidal mirror 55b. Specifically, the combined mirror 55 is arranged such that a part of the parabolic mirror 5 (which part is opposite to the opening 5b of the parabolic mirror 5) is replaced with the ellipsoidal mirror 55b.

This allows the illumination device 24 to have two focal points on the light emitting section 4 which focal points are: a focal point P1 of the parabolic mirror 55a; and a focal point P2 of the ellipsoidal mirror 55b. By irradiating the focal point P1 with the laser beam, light reflected on the combined mirror 55 can be converged. By irradiating the focal point P2 with the laser beam, light reflected on the combined mirror 55 can be diffused. That is, with the combined mirror 55, the illumination device 24 can have the plurality of focal points, thereby being capable of switching light-projection characteristics thereof.

By changing a position of the laser element 2, it is possible to select any one of the focal points P1 and P2 as an irradiation target of the laser beam. The combined mirror 55 is not limited to a combination of the parabolic mirror and the ellipsoidal mirror, but may be a combination of mirrors selected from the parabolic mirror, the ellipsoidal mirror, a hemispherical mirror, a plane mirror, etc. This allows the illumination device 24 to have a plurality of focal points on the light emitting section 4, so that the effect above is realized.

By use of a MEMS mirror, it is possible to change, to the focal point P1 or P2, a position to be irradiated with the laser beam. The MEMS mirror is a device that one mirror made by providing a silver alloy on silicon is arranged to be capable of moving by use of a piezoelectric effect of a PZT (zirconate titanate) thin film. The laser beam emitted from the laser element 2 is reflected on the MEMS mirror, and the light emitting section 4 is irradiated with the reflected laser beam. The arrangement makes it possible to change, to the focal point P1 or P2, a position to be irradiated with the laser beam.

Further, a fluorescent material contained in the light emitting section 4 may vary depending on a position on its laser-irradiated surface. For example, a fluorescent material of the light emitting section 4 may vary so that a color temperature is high at a position of the focal point P1 of the parabolic mirror 55a, and a color temperature is low at a position of the focal point P2 of the ellipsoidal mirror 55b. This makes it possible to select a light-projection characteristic in accordance with a focal point to be irradiated with the laser beam.

[Examples of Light Emitting Section]

The following describes a more concrete example of the light emitting section of the present invention. Members which are the same as those described above are given common reference signs, and the following omits to describe such members. Also, in the following description, materials, forms, and various kinds of numeral values are merely examples, and therefore do not limit the present invention.

[Example 1 of Light Emitting Section]

FIG. 13 is a conceptual view illustrating an example of the light emitting section 4 of the present invention. FIG. 13(a) is a cross-sectional schematic view illustrating the light emitting section 4. FIG. 13(b) is an enlarged view illustrating a fluorescent section 4a. FIG. 13(c) is an enlarged view illustrating transparent particle section 4b.

As illustrated in FIG. 13(a), the light emitting section 4 of the present example is made in such a manner that patterning is performed by screen printing or the like so that regions (second regions) corresponding to the transparent particle sections 4b are formed. In addition, another region (first region) corresponding to a fluorescent section 4a is formed, by patterning or the like, between adjacent transparent particle sections 4b. That is, the light emitting section 4 is made up of the fluorescent sections 4a and the transparent particle sections 4b which are arranged alternately. This makes it possible to easily control a ratio between the blue laser beams (scattered light) to be emitted from the illumination device 1 etc. and the fluorescence. This makes it possible to easily adjust chromaticity of light to be projected.

In the fluorescent section 4a, as illustrated in FIG. 13(a), the fluorescent pieces are bound by a binder. In the transparent particle section 4b, as illustrated in FIG. 13(c), the transparent particles ($Al_2O_3$, $SiO_2$, $CaF_2$, $Na_2CO_3$, $TiO_2$, SiN, AlN, or the like) are bound by the binder. The laser-irradiated surfaces (upper surfaces in FIG. 13(a)) of the fluorescent sections 4a and the transparent particle sections 4b are formed at such surface roughness that arithmetic average roughness (Ra) is not less than a wavelength of the laser beam, and maximum height (Ry) is not less than twice Ra (for example, arithmetic average roughness (Ra) is not less than 0.5 μm and maximum height (Ry) is not less than 1 μm). The laser-irradiated surfaces may be formed in such a manner that after the fluorescent sections 4a and the transparent particle sections 4b are alternately formed, the surfaces thereof are roughened by sandblasting.

The binder to be used in the fluorescent sections 4a and the transparent particle sections 4b may be, e.g., a cellulosic one such as methylcellulose and ethylcellulose. Instead, the binder may be a vinylic one such as polyvinyl alcohol and butyralized polyvinyl alcohol, or an acrylic one such as acrylic acid ester and methacrylic acid ester. However, such binders do not have a good heat resistance. Therefore, cellulosic binders are preferable in terms of life. Further, the transparent particle sections 4b may contain the fluorescent material somewhat.

[Example 2 of Light Emitting Section]

FIG. 14 is a conceptual view illustrating another example of the light emitting section 4 of the present invention. A major difference between the present example and Example 1 is that the binder is employed in Example 2 instead of the transparent particle sections 4b of Example 1. Thus, without the transparent particle sections 4b, it is possible to obtain the same characteristic (effect) as in the case of Example 1. This makes it possible to simplify design, manufacture, etc. of the light emitting section 4. By being subjected to sandblasting or the like, the laser-irradiated surface of the light emitting section 4 preferably has such surface roughness that arithmetic average roughness (Ra) is not less than the wavelength of the laser beam and maximum height (Ry) is not less than twice Ra. For example, arithmetic average roughness (Ra) is not less than 0.5 μm and maximum height (Ry) is not less than 1 μm.

Further, surface roughness which is greater than the wavelength of the laser beam may be provided on the laser-irradiated surfaces of the fluorescent sections 4a and the transparent particle sections 4b. Accordingly, the laser beam with which the laser-irradiated surface is irradiated is scattered over a wide area. This makes it possible to decrease power density of the laser beam per unit area before the laser beam exits the illumination device. This makes it possible to increase safety as compared to a case where no safety measure is taken.

The surface roughness which is greater than the wavelength of the excitation light refer to such ones that in a case where the excitation light has a wavelength of e.g. 450 nm, a distance between two adjacent depressions or two adjacent projections is greater than 450 nm. The arrangement does not have to apply to all the two adjacent depressions or all the two adjacent projections. Even if the arrangement partially applies, it is possible to surely increase safety as compare to a case where no safety measure is taken.

[Example 3 of Light Emitting Section]

FIG. 15 is a conceptual view illustrating another example of the light emitting section 4 of the present invention. A major difference between the present example and Example 1 is that in the Example 3, an AR coating 60 for 450 nm is provided on the laser-irradiated surface of the light emitting section 4, and the laser-irradiated surface is kept flat. The AR coating 60 is not essential, but is preferably provided for eliminating light reflected on the laser-irradiated surface. In Example 3, further, the light emitting section 4 contains an excitation light scatterer 61 for scattering the excitation light with which the laser-irradiated surface is irradiated. The excitation light scatterer 61 may be a fluorescent material which emits light by being irradiated with a laser beam, or may be at least any one of $Al_2O_3$, $SiO_2$, $CaF_2$, $Na_2CO_3$, $TiO_2$, SiN, and AlN. The light emitting section 4 thus contains the excitation light scatterer 61. Accordingly, the excitation light is scattered by the excitation light scatterer 61 so as to be emitted to the outside.

A center of a particle diameter distribution of the excitation light scatterer 61 is preferably not less than 500 nm. This makes it possible to surely scatter the blue laser beam. A substrate on which the light emitting section 4 is placed preferably has a flat surface on a light emitting section 4 side.

The following describes an advantage of Example 3, with reference to FIG. 16. FIG. 16 is a view illustrating how surface roughness is provided on a surface of a substrate 62 on which the light emitting section 4 is placed. In a case where the surface roughness is provided under the light emitting section 4, the light emitting section 4 randomly has parts which contain the fluorescent material particles at high density and parts which contain the fluorescent material particles at low density. This makes it difficult to control (i) intensity of the fluorescence generated from the fluorescent material and (ii) a ratio between the scattered laser beam and the fluorescence.

[Example 4 of Light Emitting Section]

FIG. 17 is a conceptual view illustrating another example of the light emitting section 4 of the present invention. FIG. 17(a) is a conceptual view illustrating a case where the laser-irradiated surface of the light emitting section 4 has a depressed shape. FIG. 17(b) is a conceptual view illustrating a case where the laser-irradiated surface has a flat shape. FIG. 17(c) is a conceptual view illustrating a case where the laser-irradiated surface has a projecting shape. The following describes advantages of the shapes of the laser-irradiated surface in FIGS. 17(a) through 17(c).

In a case where the laser-irradiated surface of the light emitting section 4 has a depressed shape (FIG. 17(a)), the excitation light is incident upon the laser-irradiated surface at a range of incident angles. Accordingly, an emission distribution of the fluorescence is also expanded. Because of the expanded emission distribution, the arrangement is suitable for an illumination device for illuminating a wide area.

In a case where the laser-irradiated surface of the light emitting section has a flat shape (FIG. 17(b)), it is possible to make the emission distribution of the fluorescence narrower as compared to the light emitting sections 4 in FIGS. 17(a) and 17(c). This increases utilization efficiency of the illumination light. This makes it possible to achieve a highest efficiency. Thus, the arrangement is a preferable one. In addition, the arrangement allows easy manufacture. Accordingly, the flat shape in FIG. 17(b) contributes to reduction of manufacturing costs of the light emitting section 4 and to cost reduction of the illumination device.

In a case where the laser-irradiated surface of the light emitting section 4 has a projecting shape (FIG. 17(c)), the excitation light is incident upon the laser-irradiated surface at a range of incident angles. Accordingly, an emission distribution of the fluorescence is also expanded. Because of the expanded emission distribution, the arrangement is suitable for an illumination device for illuminating a wide area.

[Intensity of Reflected Light]

In general, a laser beam has high power density per unit area, and therefore, there is a high risk of impairing safety in a case where a collimated laser beam is specularly reflected out of a light emitting device.

If it is possible to scatter such a laser beam over a wide area by use of the laser-irradiated surface of the light emitting section 4 so that the laser beam becomes diffusion light, it becomes possible to decrease power density of the laser beam per unit area before the laser beam exits the light emitting device.

In view of this, the following describes arrangements for decreasing intensity of specularly-reflected light, with reference to FIGS. 18 through 21.

[Line Indicating how Reflected Light Intensity Depends on Incident Angle]

FIG. 18 is a graph showing relationships between incident angles of a collimated laser beam with respect to the laser-irradiated surface of the light emitting section 4 and light intensities of specularly-reflected light. The horizontal axis represents the incident angles, and the vertical axis represents the light intensities. The laser-irradiated surface of the light emitting section 4 was flat, and a wavelength of the laser beam was 445 nm. The same holds for FIGS. 19 through 21.

As shown in FIG. 18, a light intensity of the specularly-reflected light decreases with increase of an incident angle.

Above an incident angle of 20°, the specularly-reflected light had a light intensity of substantially zero. That is, FIG. 18 shows that with an incident angle of not less than 20° with respect to the laser-irradiated surface, the specularly-reflected light is suppressed so that the safety of the illumination device 1 etc. can be ensured. Thus, it is preferable to employ an angle of not less than 20° as an incident angle of the laser beam with respect to the laser-irradiated surface of the light emitting section 4.

FIG. 19 shows light distribution characteristics for different incident angles of the laser beam with respect to the laser-irradiated surface of the light emitting section 4. The incident angles were 58°, 46°, 32°, 14° and 4°. The laser beam had an optical output of 50 mW. An angular range of a light distribution area is from 0° to 180°. Light intensities in the light distribution area are represented by the vertical axis.

As shown in FIG. 19, the specularly-reflected light of the laser beam was observed at incident angles of 14° and 4° of the laser beam with respect to the laser-irradiated surface of the light emitting section 4, but the specularly-reflected light was not observed at incident angles of 58°, 46°, and 32°. That is, the result shows that a critical angle at which intensity of the specularly-reflected light is 0 exists between incident angles 14° and 32°. This confirms the fact described with reference to FIG. 18 that that intensity of the specularly-reflected light is substantially zero above an incident angle of 20°.

[Reflected Light Intensity—Arithmetic Average Roughness (Ra) Dependency]

FIG. 20 is a graph showing relationships between arithmetic average roughnesses (Ra) of the laser-irradiated surface of the light emitting section 4 and intensities of the reflected light, for an incident angle of 80° of the laser beam with respect to the laser-irradiated surface. The horizontal axis represents the arithmetic average roughnesses (Ra) of the laser-irradiated surface, and the vertical axis represents the intensities of the reflected light.

As shown in FIG. 20, intensity of the reflected light decreases with increase of arithmetic average roughness (Ra). In a case where arithmetic average roughness (Ra) is not less than 0.5 µm, the reflected light has an intensity of 0. That is, FIG. 20 shows that with an arithmetic average roughness (Ra) of not less than 0.5 µm, it is possible to sufficiently secure the safety of the illumination device 1 etc. From this result, arithmetic average roughness (Ra) is preferably not less than 0.5 µm.

[Reflected Light Intensity—Maximum Height (Ry) Dependency]

FIG. 21 is a graph showing relationships between maximum heights (Ry) of the laser-irradiated surface of the light emitting section 4 and intensities of the reflected light, for an incident angle of 80° of the laser beam with respect to the laser-irradiated surface. The horizontal axis represents the maximum heights (Ry) of the laser-irradiated surface, and the vertical axis represents the intensities of the reflected light.

As shown in FIG. 21, intensity of the reflected light decreases with increase of a maximum height (Ry). In a case where a maximum height (Ry) is not less than 1 µm, the reflected light has an intensity of 0. That is, FIG. 21 shows that with a maximum height (Ry) of not less than 1 µm, it is possible to sufficiently secure the safety of the illumination device 1 etc. From this result, a maximum height (Ry) is preferably not less than 1 µm.

Further, the results of FIGS. 20 and 21 show that in a case where in a case where the laser-irradiated surface has such surface roughness that arithmetic average roughness (Ra) is not less than the wavelength of the laser beam, and a maximum height (Ry) is not less than twice the arithmetic average roughness, the reflection light has an intensity of 0, and this makes it possible to sufficiently secure the safety of the illumination device 1 etc.

[Effects of Illumination Device 1 Etc.]

The following describes effects of the illumination device 1 etc.

The illumination device 1 which is an illumination device capable of emitting white light, includes: a laser element 2 for emitting a blue laser beam; a light emitting section 4 for generating fluorescence by be being irradiated with the blue laser beam emitted from the laser element 2; and a parabolic mirror 5 for reflecting the fluorescence generated from the light emitting section 4, the parabolic mirror 5 being disposed on an irradiated surface side, the irradiated surface being a surface of the light emitting section 4 which surface is irradiated with the blue laser beam.

According to the arrangement, the illumination device 1 is arranged such that the parabolic mirror 5 is disposed on an irradiated surface side which irradiated surface is a surface of the light emitting section 4 which surface is irradiated with the blue laser beam, and the parabolic mirror 5 reflects the fluorescence generated from the light emitting section 4. That is, the illumination device 1 is one of a new type which transcends conventional illumination devices (hereinafter, also referred to as "transmissive" illumination device).

Therefore, the illumination device 1 of the present invention makes it possible to dissolve the problems of conventional illumination devices.

Specifically, the conventional illumination devices have a problem of increased area of an emitting surface from which the scattered laser beam and the fluorescence are emitted.

In contrast, since the illumination device 1 has the following advantages, the illumination device 1 makes it possible to dissolve the conventional problems.

First, with the arrangement above, the light emitting section 4 is arranged to have a single surface as both a surface for being irradiated with the laser beam and a surface for emitting the florescence. That is, the illumination device 1 is arranged such that the laser-irradiated surface of the light emitting section 4 is irradiated with the laser beam so that the laser-irradiated surface emits the fluorescence. This makes it possible to dissolve the conventional problem in that a light emitting area is increased due to an effect of scattering of the fluorescence and the scattered laser beam. This makes it possible to obtain a white light source with higher luminance.

Furthermore, the parabolic mirror 5 is provided on an irradiated surface side which irradiated surface is a surface of the light emitting section 4 which surface is irradiated with the laser beam. This makes it possible to restrict, to one direction more effectively, a direction in which the white light emitted from the light emitting section 4 is projected. This remarkably increases an efficiency of utilization of the white light.

Further, the laser element 2 which emits the blue laser beam is employed so that the white light is emitted from the light emitting section 4 by mixing (i) the blue laser beam which has been scattered without making contribution to the generation of the fluorescence from the light emitting section 4 with (ii) the fluorescence generated from the light emitting section 4. This makes it possible to remarkably increase an efficiency of utilization of energy of the laser beam.

Thus, the illumination device 1 makes it possible to dissolve the problems of the conventional illumination devices, efficiently obtain white light with high luminance, and efficiently project the obtained white light.

Further, the illumination device 1 may be arranged such that the light emitting section 4 has a surface opposite to its irradiated surface, the surface being in contact with a metal.

According to the arrangement, that surface of the laser emitting section 4 which is opposite to its laser-irradiated surface is not directly involved in emission of the white light, and has a contact with the metal. This makes it possible to efficiently release heat generated from the light emitting section 4. This eliminates decrease in emission efficiency of the fluorescence even in a strongly-excited state in which the laser beam is employed as excitation light. This also makes it possible to reflect, on the metal surface, the laser beam which has passed through the light emitting section 4, so as to reflect the laser beam back to the light emitting section 4, so that the laser beam having passed through the light emitting section 4 can be reused. This makes it possible to further increase an efficiency of utilization of energy of the laser beam.

Further, the illumination device 1 may be arranged such that the light emitting section 4 has a flat surface as its surface opposite to its laser-irradiated surface.

The arrangement makes it possible to increase a contact area between the surface opposite to the laser-irradiated surface and the metal or the like which has a contact therewith. This makes it possible to efficiently release heat generated from the light emitting section 4. This makes it possible to efficiently release the heat, without causing decrease in emission efficiency of the fluorescence, even in a strongly-excited state in which the laser beam is employed as the excitation light.

Further, the illumination device 1 may be arranged such that the excitation light source is a laser diode.

As described above, the illumination device 1 makes it possible to dissolve the problems of the transmissive illumination devices, efficiently obtain white light with high luminance, and efficiently project the obtained white light. In a case where the laser element 2 is an excitation light source, it is possible to obtain that point light source with ultrahigh luminance which excites a smaller area, as compared to a case where, e.g., an LED is employed as the laser element 2.

Further, the illumination device 1 may be arranged such that the light emitting section 4 includes a transparent particle 4b for scattering the laser beam with which the irradiated surface is irradiated.

In a case where, e.g., the excitation light is a laser beam, the laser beam has a high power density per unit area, and therefore, there is a high risk of impairing safety in a case where the laser beam is emitted from the illumination device 1 as reflected light.

If it is possible to scatter such a laser beam over a wide area by use of the laser-irradiated surface of the light emitting section 4, it becomes possible to decrease power density of the laser beam per unit area before the laser beam exits the illumination device 1. This makes it possible to increase safety as compared to a case where no safety measure is taken.

Thus, the arrangement in which the light emitting section 4 includes the transparent particle 4b for scattering the laser beam with which the laser-irradiated surface of the light emitting section 4 is irradiated makes it possible to scatter the laser beam on the laser-irradiated surface and thereby increase the safety of the illumination device 1.

Further, the illumination device 1 may be arranged such that surface roughness of the laser-irradiated surface is such that arithmetic average roughness (Ra) is not less than a wavelength of the laser beam, and a maximum height (Ry) is not less than twice the arithmetic average roughness.

The inventors of the present invention found that the arrangement makes it possible to scatter the laser beam over a wide area by use of the laser-irradiated surface of the light emitting section 4, and thereby realize an illumination device with a high safety.

A numerical range for defining the surface roughness of the laser-irradiated surface of the light emitting section 4 is one determined in consideration of a case where the excitation light source is a laser beam having a high power density per unit area. Therefore, the safety can be secured even if an LED which has a lower power density per unit area than the laser beam is employed as the excitation light.

Further, the illumination device 1 is preferably arranged such that the laser beam is incident upon the laser-irradiated surface at an incident angle of not less than 20°.

As described above, there is a high risk of impairing safety in a case where the excitation light is a laser beam, and the laser beam is reflected on the laser-irradiated surface of the light emitting section 4 so as to exit the illumination device 1 as it is.

In this respect, the inventors of the present invention found that by employing an angle of not less than 20° as the incident angle of the laser beam with respect to the laser-irradiated surface, it is possible to suppress reflection of the laser beam on the laser-irradiated surface, and thereby secure the safety of the illumination device 1.

A numerical range for defining an incident angle of the laser beam with respect to the laser-irradiated surface of is one determined in consideration of a case where the excitation light source is a laser beam having a high power density per unit area. Therefore, the safety can be secured even if an LED which has a lower power density per unit area than the laser beam is employed as the excitation light source.

Further, the illumination device 1 is preferably arranged such that the excitation light scatterer is a fluorescent material which emits light by being irradiated with the laser beam.

As described above, the arrangement in which the light emitting section 4 includes the excitation light scatterer for scattering the laser beam with which the laser-irradiated surface of the light emitting section 4 is irradiated makes it possible to scatter the laser beam on the laser-irradiated surface and thereby increase the safety of the illumination device 1. Further, with the arrangement in which the excitation light scatterer is a fluorescent material, the fluorescent material is irradiated with the laser beam so that the laser beam is not only scattered by the fluorescent material, but also converted into the fluorescence by the fluorescent material.

This makes it possible to increase the safety of the illumination device 1, and realize an illumination device 1 with a high emission efficiency.

Further, the illumination device 1 is preferably arranged such that the excitation light scatterer is at least one selected from the group consisting of $Al_2O_3$, $SiO_2$, $CaF_2$, $Na_2CO_3$, $TiO_2$, SiN, and AlN.

According to the arrangement, the fluorescent material emits light by being irradiated with the laser beam, and scatters the laser beam with which the laser-irradiated surface is irradiated.

This makes it possible to decrease power density per unit area in a case where, e.g., the excitation light is a laser beam. As a result, the safety of the illumination device 1 can be increased. Further, the arrangement can be utilized as a method independent from (i) the arrangement above in which surface roughness of the laser-irradiated surface of the light emitting section 4 is specified, and from the arrangement above in which an incident angle of the laser beam with respect to the laser-irradiated surface is specified.

Thus, the illumination device 1 makes it possible to provide a device with safety which is capable of emitting the white light.

Further, the excitation light scatterer may be at least one selected from the group consisting of $Al_2O_3$, $SiO_2$, $CaF_2$, $Na_2CO_3$, $TiO_2$, SiN, and AlN.

These materials are easily available. This makes it possible to easily realize a light emitting section 4 containing the excitation light scatterer. $Al_2O_3$ is more preferable than the others for its high thermal conductivity. SiN and AlN may be used as the excitation light scatterer in consideration of a possibility that SiN and AlN serve as an absorbers which absorb the laser beam.

Further, illumination device 1 may be arranged such that the laser-irradiated surface includes (i) a first region containing a fluorescent material which emits light by being irradiated with the laser beam and (ii) a second region which does not contain the fluorescent material.

In the illumination device 1, not entire laser-irradiated surface is required to contain the fluorescent material which emits light by being irradiated with the laser beam. That is, the laser-irradiated surface may have an area which contains no fluorescent material. This makes it possible to reduce costs of the fluorescent material. Further, by providing the region which contains no fluorescent material, it is possible to realize the following arrangement and effect.

Further, the illumination device 1 may be arranged such that the laser-irradiated surface includes (i) a first region containing a fluorescent material which emits light by being irradiated with the laser beam and (ii) a second region which does not contain the fluorescent material; and the second region contains the excitation light scatterer.

In a case where, e.g., the excitation light is a laser beam, the laser beam has a high power density per unit area, and therefore, there is a high risk of impairing safety in a case where the laser beam is emitted from the illumination device 1 as reflected light. If it is possible to scatter such a laser beam over a wide area by use of the excitation light scatterer on the laser-irradiated surface of the light emitting section 4, it becomes possible to decrease power density of the laser beam per unit area before the laser beam exits the illumination device 1. This makes it possible to increase safety as compared to a case where no safety measure is taken.

On the other hand, in a case where the laser-irradiated surface contains the fluorescent material, it is possible to generate the fluorescence from the fluorescent material by irradiating the fluorescent material with the laser beam.

Thus, with the arrangement above, the illumination device 1 can generate light by mixing the laser beam scattered by the excitation light scatterer on the laser-irradiated surface with the fluorescence emitted from the fluorescent material contained in the first region, while achieving a high safety.

Further, the illumination device 1 may be arranged such that a surface of the second region has surface roughness greater than the wavelength of the laser beam. The inventors of the present invention found that with the arrangement, the laser beam with which the surface of the second region is irradiated is scattered over a wide area. This makes it possible to decrease power density of the laser beam per unit area before the laser beam exits the illumination device 1. This makes it possible to increase safety as compared to a case where no safety measure is taken.

The surface roughness which is greater than the wavelength of the laser beam refer to such ones that in a case where the laser beam has a wavelength of e.g. 450 nm, a distance between two adjacent depressions or two adjacent projections is greater than 450 nm. The arrangement does not have to apply to all the two adjacent depressions or all the two adjacent projections. Even if the arrangement partially applies, it is possible to surely increase safety as compare to a case where no safety measure is taken.

Further, the illumination device 1 may be arranged such that a ratio between (i) how much of the laser beam is scattered on the irradiated surface and (ii) how much amount of light is emitted from the fluorescent material contained in the first region is controlled by the first region and the second region.

The ratio can be appropriately controlled by changing, e.g., areas and/or dispositions of the first and second regions, and/or how to form the first and second regions. Thus, the illumination device 1 can generate light of a desired color, through such control of the light amount ratio.

Further, the illumination device 1 may be arranged such that: the parabolic mirror 5 includes a curved surface formed by rotating a pattern around a rotation axis; and the light emitting section 4 is disposed so that its surface opposite to its irradiated surface faces away from the curved surface but toward the rotation axis.

The arrangement makes it possible to decrease an angle of an optical axis of the laser beam with respect to a symmetric axis of the parabolic mirror 5. This makes it possible to flexibly change where to provide the laser element 2. This allows a lightweight compact design of the illumination device 1. Further, with the arrangement, even if someone looks inside the parabolic mirror 5 by the naked eye via the opening 5b of the parabolic mirror 5, he does not directly see that part of the light emitting section 4 which has a higher luminance by being irradiated with the laser beam. This leads to a safety advantage in that no retina damage etc. is caused.

Further, the illumination device 1 may be arranged such that the light-projecting section is a parabolic mirror.

With the arrangement, by disposing the light emitting section 4 at the focal point of the parabolic mirror, the fluorescence emitted from the light emitting section 4 is reflected on the reflecting curved-surface of the parabolic mirror so that the optical path of the fluorescence is controlled. Further, by disposing the light emitting section 4 at the focal point of the parabolic mirror, the fluorescence emitted from the light emitting section 4 can be effectively projected within the predetermined solid angle. This makes it possible to increase utilization efficiency of the fluorescence.

Further, the illumination device 1 is preferably arranged such that the light-projecting section (parabolic mirror 5) has a shape which has a plurality of focal points on the light emitting section 4.

With the arrangement, by irradiating, with the laser beams, the light emitting section 4 which is disposed so that the focal points are formed on the laser-irradiated surface, it is possible to change a light-projection characteristic of the white light to be emitted from the illumination device 1.

With the arrangement, accordingly, the illumination device 1 can offer a wide variety of light-projection patterns.

The shape of the parabolic mirror 5 is not particularly limited, provided that the parabolic mirror 5 has the plurality of focal points on the light emitting section 4.

Further, the illumination device 1 is preferably arranged such that the laser element 2 is adjustable as to a position at which the laser element 2 emits the laser beam to the irradiated surface, in accordance with a shape of the light-projecting section (parabolic mirror 5).

The arrangement makes it possible to adjust a position where the laser-irradiated surface is irradiated with the laser beam. This makes it possible to easily adjust the position in a case where a change of the shape of the parabolic mirror 5 causes a positional change of the focal point of the parabolic mirror 5. This makes it possible to maintain the arrangement for a wide variety of light-projection patterns, regardless of the shape of the parabolic mirror 5.

Further, the illumination device 1 is preferably arranged such that a kind of a fluorescent material contained in the light emitting section 4 is determined depending on a position at which the laser element 2 emits the laser beam to the irradiated surface.

Even if the same kind of laser beam is used in irradiation, chromaticity etc. of the white light to be emitted varies depending on florescent materials. The arrangement above accordingly allows the illumination device 1 to cause a change of the white light to be emitted, depending on laser irradiation positions. In addition, with the arrangement, the illumination device 1 can offer a user a wide variety of light-projection patterns.

Further, the present invention may be a vehicle headlamp.

Further the present invention may be an illumination device.

The illumination device 1 is suitably applicable to a vehicle headlamp and an illumination device. In a case where the illumination device 1 is applied to a vehicle headlamp, this makes it possible to dissolve the problems of the transmissive light emitting device, and realize a vehicle headlamp capable of emitting the white light by use of the blue excitation light.

The embodiment and the examples above show examples where a reflection mirror is employed as the light-projecting section. However, the present invention can be suitably carried out also in a case where a lens is employed as the light-projecting section instead of the reflection mirror.

FIG. 23 is a conceptual view illustrating an arrangement of an illumination device 31 which includes a projector lens as the light-projecting section. As illustrated in FIG. 23, the illumination device 31 includes a light emitting section 34, a heat sink 35, and a projector lens (light-projecting section) 36. The illumination device 31 also includes a laser element 2 (not illustrated).

Although the light emitting section 34 is made of a material which is the same as the material for the light emitting section 4, its shape is different from the shape of the light emitting section 4. For example, the light emitting section 34 has such a shape that its long axis is parallel with a light-projection direction of the projector lens 36, and a upper surface 34*a* of the light emitting section 34 has a rectangular shape. The laser beam is emitted from the laser element 2 onto the upper surface 34*a* so as to form an elliptical spot.

Thus, the light emitting section 34 is formed so as to have its long axis in accordance with the shape of the spot of the laser beam. This makes it possible to efficiently irradiate the light emitting section 34 with the laser beam. The arrangement also makes it possible to suitably emit illumination light having an aspect ratio which satisfies a light distribution property standard. For example, the shape of the light emitting section 34 may be defined so that an aspect ratio of the spot of the illumination light is approximately 1:3 to 1:4.

The heat sink 35 is for supporting the light emitting section 34, and has a function of releasing, via a contact surface between the heat sink 35 and the light emitting section 34, heat generated by irradiating the light emitting section 34 with the laser beam. Accordingly, it is preferable to employ, as a material for the heat sink 35, a metal material such as aluminum and copper which are likely to conduct heat. However, the material for the heat sink 35 is not particularly limited, provided that the material has a high thermal conductivity.

A surface of the heat sink 35 which has contact with the light emitting section 34 is processed so as to reflect light, thereby serving as a reflection surface. With the arrangement, the laser beam incident via the upper surface (main light emitting surface) 34*a* of the light emitting section 34 is reflected on the reflection surface so that the laser beam is redirected toward the inside of the light emitting section 34.

The projector lens 36 is a light-projecting member for projecting the fluorescence generated from the light emitting section 34 in a predetermined light-projection direction. That is, the projector lens 36 is an optical system for projecting the fluorescence in the predetermined light-projection direction in such a manner that the projector lens 36 refracts the fluorescence by allowing the fluorescence to pass therethrough.

Thus, in the illumination device 31, the projector lens 36 is employed as a light-projecting member instead of the parabolic mirror 5. This makes it possible to realize a small illumination device.

FIG. 24 is a conceptual view illustrating an arrangement of an illumination device 32 which includes a projector lens as the light-projecting section. As illustrated in FIG. 24, the illumination device 32 includes a light emitting section 34, an ellipsoidal mirror (light-projecting section) 38, and a projector lens 36. The illumination device 32 also includes a laser element 2 (not illustrated).

A major difference between the illumination devices 31 and 32 is that the illumination device 32 further includes the ellipsoidal mirror 38 in addition to the projector lens 36 so as to accurately project the fluorescence emitted from the light emitting section 34.

The ellipsoidal mirror 38 has a first focal point f1 and a second focal point f2. The light emitting section 34 is disposed on the heat sink 35 so that the center of the light emitting section 34 is located at the first focal point f1.

In the illumination device 32, the fluorescence emitted from the light emitting section 34 disposed at the first focal point f1 is reflected by the ellipsoidal mirror 38 toward the second focal point f2. Then, the fluorescence passes through the second focal point f2 and the projector lens 36 in this order so as to be projected within a predetermined angle range.

Such combination use of the projector lens 36 and the ellipsoidal mirror 38 makes it possible to accurately project the fluorescence emitted from the light emitting section 34.

For both illumination devices 31 and 32, an incident angle of the laser beam with respect to the upper surface 34*a* of the light emitting section 34 is important from a viewpoint of utilization efficiency of the laser beam and the fluorescence.

First, as described above, if an incident angle of the laser beam is inappropriate, a reflectance at which the laser beam is reflected on the upper surface 34*a* of the light emitting section 34 is high so that a proportion of the laser beam to be converted into the fluorescence is decreased.

Further, the setting of an incident angle of the laser beam can affect a positional relationship between the light emitting section 34 and the projector lens 36. Therefore, it is important to appropriately set the incident angle of the laser beam in order to dispose the light emitting section 34 and the projector lens 36 so that a preferable positional relationship is established therebetween.

Further, it is preferable to appropriately set the incident angle of the laser beam, in order to irradiate the light emitting section 34 with the laser beam, without providing an opening to the ellipsoidal mirror 38.

(Other Expressions of the Present Invention)

A light emitting device of the present invention is a light emitting device capable of emitting white light, including: an excitation light source for emitting blue excitation light; a light emitting section for generating fluorescence by being irradiated with the blue excitation light; and a reflection mirror for reflecting the fluorescence generated from the light emitting section, the reflection mirror being disposed on an irradiated surface side which irradiated surface is a surface of the light emitting section which surface is irradiated with the blue excitation light.

According to the arrangement, the light emitting device of the present invention is arranged such that the reflection mirror is disposed on an irradiated surface side which irradiated surface is a surface of the light emitting section which surface is irradiated with the excitation light, and the reflection mirror reflects the fluorescence generated from the light emitting section.

This allows the light emitting device of the present invention to dissolve various problems of conventional light emitting devices.

Specifically, the conventional light emitting devices have a problem in that it is difficult to obtain ultrahigh luminance specific to a light source utilizing a laser due to increased area of an emitting surface from which the scattered excitation light and the fluorescence are emitted.

In contrast, since the light emitting device of the present invention has the following advantages, the light emitting device makes it possible to dissolve the conventional problems.

First, with the arrangement above, the light emitting section is arranged to have a single surface as both a surface for being irradiated with the excitation light and a surface for emitting the florescence. That is, the light emitting device of the present invention is arranged such that the irradiated surface of the light emitting section is irradiated with the excitation light so that the irradiated surface emits the fluorescence. This makes it possible to dissolve the conventional problem of increase of a light emitting area due to an effect of the fluorescence and the scattered excitation light. This makes it possible to obtain a white light source with ultrahigh luminance.

Furthermore, the reflection mirror is provided on an irradiated surface side which irradiated surface is a surface of the light emitting section which surface is irradiated with the excitation light. This makes it possible to restrict, to one direction more effectively, a direction in which the white light emitted from the light emitting section 4 is projected. This remarkably increases an efficiency of utilization of the white light.

Further, in the present invention, the excitation light source which emits the blue excitation light is employed so that the white light is emitted from the light emitting section by mixing (i) the blue excitation light which has been scattered without making contribution to the generation of the fluorescence from the light emitting section with (ii) the fluorescence generated from the light emitting section. This makes it possible to remarkably increase an efficiency of utilization of energy of the excitation light.

Thus, the light emitting device of the present invention makes it possible to dissolve the problems of the conventional light emitting devices, efficiently obtain white light with high luminance, and efficiently project the obtained white light. The light emitting device of the present invention may be arranged such that the light emitting section has a surface opposite to its irradiated surface, the surface being in contact with a metal.

According to the arrangement, that surface of the laser emitting section which is opposite to its irradiated surface is not directly involved in emission of the white light, and has a contact with the metal. This makes it possible to efficiently release heat generated from the light emitting section. This eliminates decrease in emission efficiency of the fluorescence even in a strongly-excited state in which the laser beam is employed as excitation light. This also makes it possible to reflect, on the metal surface, the excitation light which has passed through the light emitting section, so as to reuse the excitation light. This makes it possible to further increase an efficiency of utilization of energy of the excitation light.

Further, light emitting device of the present invention 1 may be arranged such that the light emitting section has a flat surface as its surface opposite to its irradiated surface.

The arrangement makes it possible to increase a contact area between the surface opposite to the irradiated surface and the metal or the like which has a contact therewith. This makes it possible to efficiently release heat generated from the light emitting section. This makes it possible to efficiently release the heat, without causing decrease in emission efficiency of the fluorescence, even in a strongly-excited state in which the laser beam is employed as the excitation light.

Further, the light emitting device of the present invention may be arranged such that the excitation light source is a laser diode.

As described above, the light emitting device of the present invention makes it possible to dissolve the problems of the transmissive light emitting device, efficiently obtain white light with high luminance, and efficiently project the obtained white light. In a case where the excitation light source is a laser diode, it is possible to obtain that point light source with ultrahigh luminance which excites a smaller area, as compared to a case where, e.g., an LED is employed as the excitation light source.

Further, the light emitting device of the present invention may be arranged such that the light emitting section includes an excitation light scatterer for scattering the excitation light with which the irradiated surface is irradiated.

In a case where, e.g., the excitation light is a laser beam, the laser beam has a high power density per unit area, and therefore, there is a high risk of impairing safety in a case where the laser beam is emitted from the light emitting device as reflected light.

If it is possible to scatter such a laser beam over a wide area by use of the irradiated surface of the light emitting section, it becomes possible to decrease power density of the laser beam per unit area before the laser beam exits the light emitting device. This makes it possible to increase safety as compared to a case where no safety measure is taken.

Thus, the arrangement in which the light emitting section includes the excitation light scatterer for scattering the excitation light with which the irradiated surface of the light emitting section is irradiated makes it possible to scatter the excitation light on the irradiated surface and thereby increase the safety of the light emitting device.

Further, the light emitting device of the present invention may be arranged such that surface roughness of the irradiated surface is such that arithmetic average roughness (Ra) is not less than a wavelength of the excitation light, and a maximum height (Ry) is not less than twice the arithmetic average roughness.

The inventors of the present invention found that the arrangement makes it possible to scatter the excitation light over a wide area by use of the irradiated surface of the light emitting section, and thereby realize a light emitting device with a high safety.

A numerical range for defining the surface roughness of the irradiated surface of the light emitting section 4 is one determined in consideration of a case where the excitation light is a laser beam having a high power density per unit area.

Therefore, the safety can be secured even if an LED which has a lower power density per unit area than the laser beam is employed as the excitation light.

Further, the light emitting device of the present invention is preferably arranged such that the excitation light is incident upon the irradiated surface at an incident angle of not less than 20°.

As described above, there is a high risk of impairing safety in a case where the excitation light is a laser beam, and the laser beam is reflected on the irradiated surface of the light emitting section so as to exit the light emitting device as it is.

In this respect, the inventors of the present invention found that by employing an angle of not less than 20° as the incident angle of the laser beam with respect to the irradiated surface, it is possible to suppress reflection of the laser beam on the laser-irradiated surface, and thereby secure the safety of the light emitting device.

A numerical range for defining an incident angle of the excitation light with respect to the irradiated surface of is one determined in consideration of a case where the excitation light is a laser beam having a high power density per unit area. Therefore, the safety can be secured even if an LED which has a lower power density per unit area than the laser beam is employed as the excitation light.

Further, the light emitting device of the present invention is preferably arranged such that the excitation light scatterer is a fluorescent material which emits light by being irradiated with the excitation light.

As described above, the arrangement in which the light emitting section includes the excitation light scatterer for scattering the excitation light with which the irradiated surface of the light emitting section is irradiated makes it possible to scatter the excitation light on the laser-irradiated surface and thereby increase the safety of the illumination device 1. Further, with the arrangement in which the excitation light scatterer is a fluorescent material, the fluorescent material is irradiated with the excitation light so that the excitation light is scattered by the fluorescent material, and in addition, the fluorescence is generated from the fluorescent material.

This makes it possible to increase the safety of the light emitting device, and realize a light emitting device with a high emission efficiency.

Further, the light emitting device of the present invention is preferably arranged such that the excitation light scatterer is at least one selected from the group consisting of $Al_2O_3$, $SiO_2$, $CaF_2$, $Na_2CO_3$, $TiO_2$, SiN, and AlN.

According to the arrangement, the fluorescent material emits light by being irradiated with the excitation light, and scatters the excitation light with which the irradiated surface is irradiated.

This makes it possible to decrease power density per unit area in a case where, e.g., the excitation light is a laser beam. As a result, the safety of the light emitting device can be increased. Further, the arrangement can be utilized as a method independent from (i) the arrangement above in which surface roughness of the irradiated surface of the light emitting section is specified, and from the arrangement above in which an incident angle of the laser beam with respect to the irradiated surface is specified.

Thus, the light emitting device of the present invention makes it possible to provide a device with safety which is capable of emitting the white light.

Further, the excitation light scatterer may be at least one selected from the group consisting of $Al_2O_3$, $SiO_2$, $CaF_2$, $Na_2CO_3$, $TiO_2$, SiN, and AlN These materials are easily available. This makes it possible to easily realize a light emitting section containing the excitation light scatterer. $Al_2O_3$ is more preferable than the others for its high thermal conductivity. SiN and AlN may be used as the excitation light scatterer in consideration of a possibility that SiN and AlN serve as an absorbers which absorb the excitation light.

Further, the light emitting device of the present invention may be arranged such that the irradiated surface includes (i) a first region containing a fluorescent material which emits light by being irradiated with the excitation light and (ii) a second region which does not contain the fluorescent material.

In the light emitting device of the present invention, not entire irradiated surface is required to contain the fluorescent material which emits light by being irradiated with the excitation light. That is, the irradiated surface may have an area which contains no fluorescent material. This makes it possible to reduce costs of the fluorescent material. Further, by providing the region which contains no fluorescent material, it is possible to realize the following arrangement and effect.

Further, the light emitting device of the present invention may be arranged such that the irradiated surface includes (i) a first region containing a fluorescent material which emits light by being irradiated with the excitation light and (ii) a second region which does not contain the fluorescent material; and the second region contains the excitation light scatterer.

In a case where, e.g., the excitation light is a laser beam, the laser beam has a high power density per unit area, and therefore, there is a high risk of impairing safety in a case where the laser beam is emitted from the light emitting device as reflected light. If it is possible to scatter such a laser beam over a wide area by use of the excitation light scatterer on the irradiated surface of the light emitting section, it becomes possible to decrease power density of the laser beam per unit area before the laser beam exits the light emitting device. This makes it possible to increase safety as compared to a case where no safety measure is taken.

On the other hand, in a case where the irradiated surface contains the fluorescent material, it is possible to generate the fluorescence from the fluorescent material by irradiating the fluorescent material with the excitation light.

Thus, with the arrangement above, the light emitting device of the present invention can generate light by mixing the excitation light scattered by the excitation light scatterer on the irradiated surface with the fluorescence emitted from the fluorescent material contained in the first region, while achieving a high safety.

Further, the light emitting device of the present invention may be arranged such that a surface of the second region has surface roughness greater than the wavelength of the excitation light.

The inventors of the present invention found that with the arrangement, the excitation light with which the surface of the second region is irradiated is scattered over a wide area. This makes it possible to decrease power density of the excitation light per unit area before the excitation light exits the light emitting device. This makes it possible to increase safety as compared to a case where no safety measure is taken.

The surface roughness which is greater than the wavelength of the excitation light refer to such ones that in a case where the excitation light has a wavelength of e.g. 450 nm, a distance between two adjacent depressions or two adjacent projections is greater than 450 nm. The arrangement does not have to apply to all the two adjacent depressions or all the two adjacent projections. Even if the arrangement partially applies, it is possible to surely increase safety as compare to a case where no safety measure is taken.

Further, the light emitting device of the present invention may be arranged such that a ratio between (i) how much of the excitation light is scattered on the irradiated surface and (ii) how much amount of light is emitted from the fluorescent material contained in the first region is controlled by the first region and the second region.

The ratio can be appropriately controlled by changing, e.g., areas and/or dispositions of the first and second regions, and/or how to form the first and second regions. Thus, the light emitting device can generate light of a desired color, through such control of the light amount ratio.

Further, the light emitting device of the present invention may be arranged such that: the reflection mirror includes a curved surface formed by rotating a pattern around a rotation axis; and the light emitting section is disposed so that its surface opposite to its irradiated surface faces away from the curved surface but toward the rotation axis.

The arrangement makes it possible to decrease an angle of an optical axis of the excitation light with respect to a symmetric axis of the reflection mirror. This makes it possible to flexibly change where to provide the excitation light source. This allows a lightweight compact design of the light emitting device. Further, with the arrangement, even if someone looks inside the reflection mirror by the naked eye via the opening thereof, he does not directly see that part of the light emitting section which has a higher luminance by being irradiated with the excitation light. This leads to a safety advantage in that no retina damage etc. is caused.

Further, the light emitting device of the present invention may be arranged such that the reflection mirror is a parabolic mirror.

With the arrangement, by disposing the light emitting section at the focal point of the parabolic mirror, the fluorescence emitted from the light emitting section is reflected on the reflecting curved-surface of the parabolic mirror so that the optical path of the fluorescence is controlled. Further, by disposing the light emitting section at the focal point of the parabolic mirror, the fluorescence emitted from the light emitting section can be effectively projected within the predetermined solid angle. This makes it possible to increase utilization efficiency of the fluorescence.

Further, the light emitting device of the present invention is preferably arranged such that the reflection mirror has a shape which has a plurality of focal points on the light emitting section.

With the arrangement, by irradiating, with the excitation light, the light emitting section which is disposed so that the focal points are formed on the irradiated surface, it is possible to change a light-projection characteristic of the white light to be emitted from the light emitting device.

With the arrangement, accordingly, the light emitting device of the present invention can offer a wide variety of light-projection patterns.

The shape of the reflection mirror is not particularly limited, provided that the reflection mirror has the plurality of focal points on the light emitting section.

Further, light emitting device of the present invention is preferably arranged such that the excitation light source is adjustable as to a position at which the excitation light source emits the excitation light to the irradiated surface, in accordance with a shape of the reflection mirror.

The arrangement makes it possible to adjust a position where the irradiated surface is irradiated with the excitation light. This makes it possible to easily adjust the position in a case where a change of the shape of the reflection mirror causes a positional change of the focal point of the reflection mirror. This makes it possible to maintain the arrangement for a wide variety of light-projection patterns, regardless of the shape of the reflection mirror.

Further, the light emitting device of the present invention is preferably arranged such that a kind of a fluorescent material contained in the light emitting section is determined depending on a position at which the excitation light source emits the excitation light to the irradiated surface.

Even if the same kind of excitation light is used in irradiation, chromaticity etc. of the white light to be emitted varies depending on florescent materials. The arrangement above accordingly allows the light emitting device of the present invention to cause a change of the white light to be emitted, depending on a position where the irradiated surface is irradiated with the excitation light. In addition, with the arrangement, the light emitting device can offer a user a wide variety of light-projection patterns.

Further, the present invention may be a vehicle headlamp. Further the present invention may be an illumination device.

The light emitting device of the present invention is suitably applicable to a vehicle headlamp and an illumination device. In a case where the light emitting device of the present invention is applied to a vehicle headlamp, this makes it possible to dissolve the problems of the transmissive light emitting device, and realize a vehicle headlamp capable of emitting the white light by use of the blue excitation light.

INDUSTRIAL APPLICABILITY

The present invention relates to a light emitting device which makes it possible to (i) obtain a white point light source highly efficiently by exciting a fluorescent material by using a solid light emitting element such as a laser as an excitation light source, and (ii) project the obtained white illumination light highly efficiently. The present invention is applicable to such a light emitting device, such an illumination device, and such a vehicle headlamp particularly suitably.

REFERENCE SIGNS LIST

1, 20 through 24, 31, 32 Illumination device
2 Laser element (excitation light source)
3 Lens
4, 34 Light emitting section
4a Fluorescent section (excitation light scatterer)
4b Transparent particle section (excitation light scatterer)
5 Parabolic mirror (light-projecting section)
5a Reference sign
5b Opening
6 Window section
7 Metal base
8 Fin
10 Automobile
14, 14a, 14b, 14c Reflection mirror
35 Heat sink
36 Projector lens (light-projecting section)
50 Redirection mirror
55 Combined mirror (light-projecting section)
55a Parabolic mirror (light-projecting section)
55b Ellipsoidal mirror (light-projecting section)
60 AR coating
61 Excitation light scatterer
P1 Focal point
P2 Focal point The invention is claimed is:

1. A light emitting device capable of emitting white light, comprising:
    an excitation light source for emitting blue excitation light and comprising a plurality of semiconductor lasers; and
    a light emitting section containing a fluorescent material that emits fluorescence in an irradiated surface of the light emitting section when irradiated with the blue excitation light source, the irradiated surface being a surface to be irradiated with the blue excitation light,
    the light emitting section further containing an excitation light scatterer in a form of particles in the irradiated surface, the excitation light scatterer being different from the fluorescent material and scattering the blue excitation light with which the irradiated surface is irradiated,
    particles of the fluorescent material and the excitation light scatterer being irradiated with the blue excitation light in the irradiated surface, and
    the plurality of semiconductor lasers being configured so that excitation blue laser beams from the semiconductor lasers are superposed on each other at a portion of the irradiated surface of the light emitting section.

2. The light emitting device as set forth in claim 1, wherein:
    chromaticity of light outputted from the light emitting device is controlled by a ratio between an area of a region containing the fluorescent material and an area of a region containing the excitation light scatterer in the irradiated surface.

* * * * *